United States Patent [19]

Yamamoto et al.

[11] Patent Number: 5,319,840
[45] Date of Patent: Jun. 14, 1994

[54] METHOD FOR THE ASSEMBLY OF AUTOMOTIVE VEHICLES

[75] Inventors: Seikichi Yamamoto; Nobuo Kihara; Shuji Nishimoto; Hiroaki Inoue, all of Hiroshima, Japan

[73] Assignee: Mazda Motor Corporation, Hiroshima, Japan

[21] Appl. No.: 813,742

[22] Filed: Dec. 30, 1991

[30] Foreign Application Priority Data

Dec. 28, 1990 [JP] Japan .................................. 2-408549
Jan. 30, 1991 [JP] Japan .................................. 3-31935
Mar. 20, 1991 [JP] Japan .................................. 3-81662

[51] Int. Cl.$^5$ .............................................. B23P 19/00
[52] U.S. Cl. ........................................ 29/430; 29/458; 29/464; 29/469
[58] Field of Search ................ 29/429, 430, 431, 458, 29/464, 466, 467, 468, 469, 783, 786, 791, 793

[56] References Cited

U.S. PATENT DOCUMENTS

| | | | |
|---|---|---|---|
| 4,590,654 | 5/1986 | Kajiura | 29/469 X |
| 4,611,380 | 9/1986 | Abe et al. | 29/430 |
| 4,683,651 | 8/1987 | Taketani et al. | 29/786 |
| 4,685,208 | 8/1987 | Sekiraku | 29/786 |
| 4,793,055 | 12/1988 | Shintani | 29/786 |
| 4,920,213 | 6/1990 | Hayakawa et al. | 29/793 |
| 5,079,822 | 1/1992 | Arai et al. | 29/431 X |

FOREIGN PATENT DOCUMENTS

| | | |
|---|---|---|
| 56-11514 | 3/1981 | Japan . |
| 61-4562 | 1/1986 | Japan . |
| 61-163297 | 7/1986 | Japan . |
| 0113659 | 5/1987 | Japan .................. 29/430 |
| 0157873 | 7/1987 | Japan .................. 29/430 |
| 63-265779 | 11/1988 | Japan . |
| 2232366 | 12/1990 | United Kingdom .................. 29/783 |

Primary Examiner—Timothy V. Eley
Attorney, Agent, or Firm—Fish & Richardson

[57] ABSTRACT

The method involved in the present invention is directed to the coating step where an assembled unit of the upper vehicle body and the under vehicle body is coated and the upper vehicle body section is separated from the under vehicle body after coating. In the vehicle body assembly step, the vehicle body is loaded on a jig unit disposed so as to be movable through stations located along the vehicle body assembly line. Upon loading the upper vehicle body on the jig unit, the vehicle body is aligned with the jig unit on the basis of an inner member of a member for structuring the vehicle body with the aid of an aligning unit mounted to the jig unit. After coating the assembled vehicle body unit, the unit is divided into the upper vehicle body and the under vehicle body, which are then processed in separate mounting steps. After mounting various parts to each of the upper vehicle body and the under vehicle body in their own mounting lines, the upper vehicle body is combined with the under vehicle body. The lower part unit is then mounted to the vehicle body assembly or mounted to the under vehicle body prior to the assembly of the under vehicle body with the upper vehicle body.

24 Claims, 27 Drawing Sheets

METHOD FOR THE ASSEMBLY OF AUTOMOTIVE VEHICLES

BACKGROUND OF THE INVENTION

1. Field of the Invention

The present invention relates to a method for the assembly of automotive vehicles.

2. Description of the Related Art

Generally, the method of the assembly of automotive vehicles basically comprises four steps, that is, a press molding step for forming vehicle body structuring members, such as bonnets, trunk lids and so on, an assembly step for mounting these vehicle body structuring members to vehicle body sections into a white vehicle body section, a coating step for coating the white vehicle body section with coating paints, and a vehicle body assembly step.

The white vehicle body section assembly step further comprises an aligning step for aligning an assembly of each of a floor panel, a front body section and a rear body section with a pallet disposed in a vehicle body assembly line, an under vehicle body section assembly step for the assembly of the vehicle body sections by temporarily and additionally welding them, thereby forming an under vehicle body section, an aligning step for aligning the under vehicle body section with the vehicle body structuring members, such as the assembled body side panels, roof panels and so on, with the aid of exclusive aligning jigs by fixing the vehicle body structuring members on the basis of a reference surface of the outer panel, and a welding step for temporarily and additionally welding the resulting vehicle body section. The resulting vehicle body shell (white vehicle body section) is then conveyed to the coating step.

In the coating step, the vehicle body shell, or the white vehicle body section, is then subjected to chemical conversion treatment and further coated with under coating, intermediate coating and overcoating, as needed. Further, an anti-chipping paint may be coated prior to the intermediate coating or subsequent to the overcoating, as disclosed in Japanese Patent Laid-open Publication (kokai) Nos. 61-163,297 and 61-4,562.

When the vehicle body shell is coated in such a state that the lid members, such as the bonnet and the side doors, are temporarily mounted to the vehicle body shell, the lid members are generally removed from the vehicle body shell after the necessary coating has been finished, followed by mounting necessary parts, units, mountings or accessories to the lid members in an exclusive mounting line.

In the vehicle body assembly line, the parts, units, mountings or accessories, such as screws, grommets, fasteners, harnesses, trims, floor mats, instrument panel, seats and seat belts, are mounted to the vehicle body shell. Further, the lower part unit, such as the internal combustion engine, suspensions, tires and a fuel tank, are mounted. In addition, the lid members such as the bonnet and the side doors are mounted.

Japanese Patent Laid-open Publication (kokai) No. 64-1,667 discloses a holding apparatus for the assembly of the vehicle body shell in order to simplify the assembly operations of the vehicle body shells in the white vehicle body assembly step. This holding apparatus is so arranged as to perform the step for inserting a frame into the partially assembled vehicle body shell (at least prior to the mounting of the roof panel) through a roof opening section thereof and the step for assembling the rest of the vehicle body structuring members with the aid of plural clamping units or devices and tools mounted to the frame.

Recently, it has been proposed that the vehicle body shell should be separated into an upper vehicle body section and an under vehicle body section composed mainly of a floor panel. The upper vehicle body section and the under vehicle body section are separately assembled with the corresponding parts, units, mountings or accessories and then conveyed to the vehicle body assembly step, in order to simplify the operations in the vehicle body assembly step to a great extent. This step can further improve the efficiency in the mounting operations for mounting the lower part units and the various parts, units, mountings or accessories.

Further, Japanese Patent Laid-open Publication (kokai) No. 63-265,779 discloses a process of assembly of automotive vehicles, which involves coating each of the vehicle body structuring members constituting the upper vehicle body section and the under vehicle body section as well as the lid members, assembling the upper vehicle body section and the under vehicle body section separately, mounting the lid members and the mountings, etc. to the upper vehicle body section assembly, mounting the lower part units to the under vehicle body section to form an under vehicle body section assembly, and then combining the upper vehicle body section assembly with the under vehicle body section assembly.

This process, however, suffers from economical disadvantages because it increases the coating lines, it makes the coating step complicated, and it increases the number of conveying units and apparatuses, because each of the vehicle body structuring members such as the upper vehicle body section and the under vehicle body section is separately coated in the coating step. Further, it is difficult to provide both of the upper vehicle body section and the under vehicle body section with uniform coatings.

In addition, a conventional white vehicle body assembly step is so arranged as to assemble the white vehicle body sections with each other by setting each of the vehicle body structuring members on the basis of the outer panel thereof. This step, however, suffers from disadvantages that accuracy in assembling the white vehicle body may be lowered and various jigs are required so as to agree with the assembly of different models and kinds of white vehicle body section. This is because first, the outer panel is low in rigidity; secondly, the curved outer panel has the property of being returned to its original shape due to elasticity; thirdly, the alignment is performed merely by receiving the panel surface when the white vehicle body is fixed on the basis of the outer panel so that accuracy in the alignment becomes low; and, fourth, the jigs are not of general purpose type. The low accuracy in the assembly of the white vehicle body may become a cause of lowering the efficiency of operations, which follow, and may become an obstacle for the automation of the mounting operations.

SUMMARY OF THE INVENTION

The object of the present invention is to provide a method for the assembly of automotive vehicles so adapted as to simplify particularly the coating step when the upper vehicle body section and the under vehicle body section are separately mounted with parts, units, mountings or accessories in their individual assembly lines and the upper vehicle body section is united with the under vehicle body section.

In order to achieve the aforesaid object, the present invention consists of a method for the assembly of automotive vehicles in a vehicle body assembly line, containing a white vehicle body assembly step for assembling an upper vehicle body section and an under vehicle body section into a white vehicle body assembly prior to coating, a coating step for coating the white vehicle body assembly assembled in the white vehicle body assembly step, and a vehicle body assembly step for mounting parts, units, mountings or accessories to the vehicle body sections subsequent to the coating step; wherein:

the white vehicle body assembly step comprises separately or independently a step for assembling the under vehicle body section composed mainly of a floor panel member and a step for assembling the upper vehicle body section constituting a vehicle body when assembled with the under vehicle body section;

the coating step for coating the white vehicle body assembly conveyed from the white vehicle body assembly step while the white vehicle body assembly is loaded on conveying means for conveying the white vehicle body assembly from the white vehicle body assembly step to the coating step; and the vehicle body assembly step for separately mounting parts, units, mountings and/or accessories to the upper vehicle body section and the under vehicle body section, separated from the white vehicle body assembly subsequent to the coating step, in respectively exclusive mounting lines and thereafter for assembling the upper vehicle body section with the under vehicle body section.

In accordance with the present invention, the upper vehicle body section is combined with the under vehicle body section and the resulting white vehicle body is coated in the coating step while being conveyed through the coating line with the aid of the identical conveying means after they have been conveyed from the white vehicle body assembly step. This arrangement for the coating step can provide advantages because complication of the coating step and the conveying means in the coating line can be prevented, and the coating step can provide uniform quality of coatings between the upper vehicle body section and the under vehicle body section because they are coated in such a state that they are combined with each other.

Further, when no overcoating is required in the coating step, for example, as for the under vehicle body section, the under vehicle body section can be separated from the upper vehicle body section prior to the overcoating of the upper vehicle body section, thereby omitting the unnecessary coating for the under vehicle body section and, as a result, saving the quantity of the paint and the time required otherwise for unnecessarily overcoating the under vehicle body section.

In the mounting step for mounting the parts, units, mountings or accessories, they can be mounted to the upper vehicle body section with its floor side open and to the under vehicle body section with its upper side open. This can readily lead to automation of the mounting operations for both of the upper and under vehicle body sections.

In a preferred aspect of the present invention, it is desired that the basic members for structuring the vehicle body for the upper vehicle body section are set on the basis of the inner member of the upper vehicle body section in assembling the white vehicle body because the inner member is more rigid than the outer member and the structure of the inner member is simpler than that of the outer member, thereby undergoing less influence of the curved outer panel having the property of returning to its original shape due to its own elasticity, thereby enabling the accurate mounting of the upper vehicle body section. In addition, the inner panel does not vary in its shape to a larger extent than the outer panel in accordance with different models and kinds of automotive vehicles, so that the alignment of the upper vehicle body section with the inner panel can apply to various models and kinds of automotive vehicles by employing a common jig. In other words, the alignment with the inner panel is advantageous because the jig can generally be employed. In addition, the improvement in accuracy of the mounting of the upper vehicle body section is advantageous in terms of the automation of the mounting step for mounting the parts, units, mountings and accessories to the upper vehicle body section as well as in terms of improvements in the efficiency of the working operations for the mounting step therefor.

In a further preferred aspect, the present invention consists of a method for the assembly of automotive vehicles, wherein the vehicle body assembly step is carried out in the mounting line for mounting parts, units, mountings and/or accessories, which comprises a guide rail disposed in or along the mounting line; and a carrier, conveyor or carriage disposed on and along the guide rail in such a state that the upper vehicle body section is loaded thereon; wherein the carrier, conveyor or carriage is loaded with a working robot for aligning the upper vehicle body section with the carrier, conveyor or carriage and mounting the parts, units, mountings and/or accessories to the upper vehicle body section loaded thereon as well as with aligning means for aligning the upper vehicle body section with the carrier, conveyor or carriage; and wherein the parts, units, mountings and/or accessories disposed on the carrier, conveyor or carriage are assembled with other and mounted to the upper vehicle body section while the upper vehicle body section is conveyed through the carrier, conveyor or carriage.

As described hereinabove, the various parts, units, mountings and/or accessories disposed on the carrier, conveyor or carriage can be assembled with each other and then mounted to the upper vehicle body section loaded on and conveyed via the carrier, conveyor or carriage, with the aid of the working robot disposed thereon, after having been aligned with the aid of the aligning means. Hence, unlike in conventional vehicle body assembly line, the mounting step according to the present invention does not require the carrier, conveyor or carriage to stop whenever the upper vehicle body section loaded thereon is mounted with the parts, etc. in the mounting stations, because the parts, etc. are mounted to the upper vehicle body section with the aid of the working robot disposed or loaded thereon. In addition, no laborious adjustment in operations for aligning the upper vehicle body section with the working robots is required because the aligning means is preset in the predetermined position on the carrier, conveyor or carriage. Furthermore, continuous operations can be implemented in mounting the parts, etc. disposed and loaded thereon with the aid of the robots, thereby saving the time for waiting for the entry of a fresh upper vehicle body section required otherwise in the conventional vehicle body assembly line. This can improve the working efficiency of the robots to a great extent.

Other objects, features and advantages of the present invention will become apparent in the course of the description of the preferred embodiments, which follows, with reference to the accompanying drawings.

BRIEF DESCRIPTION OF THE DRAWINGS

FIGS. 1 to 24 are directed to the first embodiment according to the present invention; in which:

FIG. 1 is a block diagram showing the outline of the method according to the present invention;

FIG. 2 is schematic perspective view showing an assembly line of the assembly of the white vehicle bodies, particularly upper vehicle body sections, in the white vehicle body assembly line;

FIG. 3 is a perspective view showing a jig unit disposed in the white vehicle body assembly line;

FIG. 4 is a plan view showing the jig unit of FIG. 3, disposed in the white vehicle body assembly line;

FIG. 5 is a side view showing the jig unit of FIG. 3, disposed in the white vehicle body assembly line;

FIG. 6 is a front view showing the jig unit of FIG. 3, disposed in the white vehicle body assembly line;

FIG. 7 is a schematic representation showing the detail of a clamping unit disposed in the jig unit;

FIG. 8 is a schematic representation showing the first to fourth stations in the white vehicle body assembly line;

FIG. 9 is a schematic representation showing the fifth to eighth stations in the white vehicle body assembly line;

FIG. 10 is a schematic representation showing the ninth station, followed by the vehicle body section assembly step and the lid members mounting step, in the white vehicle body assembly line;

FIG. 11 is a side view showing the conveying unit for supplying the side inner panel to the second station in the vehicle body assembly line;

FIG. 12 is a perspective view showing the working robot for supplying the side door to the second station in the vehicle body assembly line;

FIG. 13 is a front view showing the elevating-lowering apparatus for evacuating the upper vehicle body section from the jig unit in the ninth station in the vehicle body assembly line;

FIG. 14 is a front view showing a hanger for conveying the upper vehicle body section and the under vehicle body section to the coating step;

FIG. 15 is a side view showing the hanger of FIG. 14;

FIG. 16 is a schematic representation showing a vehicle body assembly line for the assembly of the vehicle body section by mounting the parts, etc. to the coated vehicle body section;

FIG. 17 is a perspective view showing a carrier, conveyor or carriage disposed in a first parts mounting line for mounting the parts, etc., such as grommets, fasteners and so on, to the upper vehicle body section;

FIG. 18 is a side view showing the carrier, conveyor or carriage of FIG. 17;

FIG. 19 is a plan view showing the carrier, conveyor or carriage of FIG. 17;

FIG. 20 is a sectional view showing the working robot disposed on the carrier, conveyor or carriage of FIG. 17 so as to be located within a cabin section of the upper vehicle body section;

FIG. 21 is an exploded perspective view showing the sequence of the steps for mounting the seats, etc. to the floor unit as the under vehicle body section;

FIG. 22 is a plan view showing the assembly station for the assembly of the upper vehicle body section with the under vehicle body section, to each of which the various parts, etc. have been mounted;

FIG. 23 is a side view showing the assembly line of FIG. 22; and

FIG. 24 is a side view showing the vehicle body assembly station in which the lower parts unit is mounted to the vehicle body section assembly of the upper vehicle body section with the under vehicle body section.

FIGS. 25 to 27 are directed to other embodiments of the present invention; in which:

FIG. 25 is a schematic perspective representation showing the vehicle body section assembly line for the assembly of the white vehicle body, particularly the upper vehicle body section, according to the second embodiment of the present invention.

FIG. 26 is a schematic perspective representation showing part of the vehicle body section assembly line for the assembly of the white vehicle body, particularly the upper vehicle body section, according to the third embodiment of the present invention as a variant thereof.

FIG. 27 is a side view with the essential portion extended, showing the aligning unit disposed on the jig unit as a variant of the jig unit of FIG. 2, etc. according to the fourth embodiment of the present invention.

DESCRIPTION OF THE PREFERRED EMBODIMENTS

The present invention will be described more in detail with reference to the accompanying drawings.

First Embodiment

Figure 1:
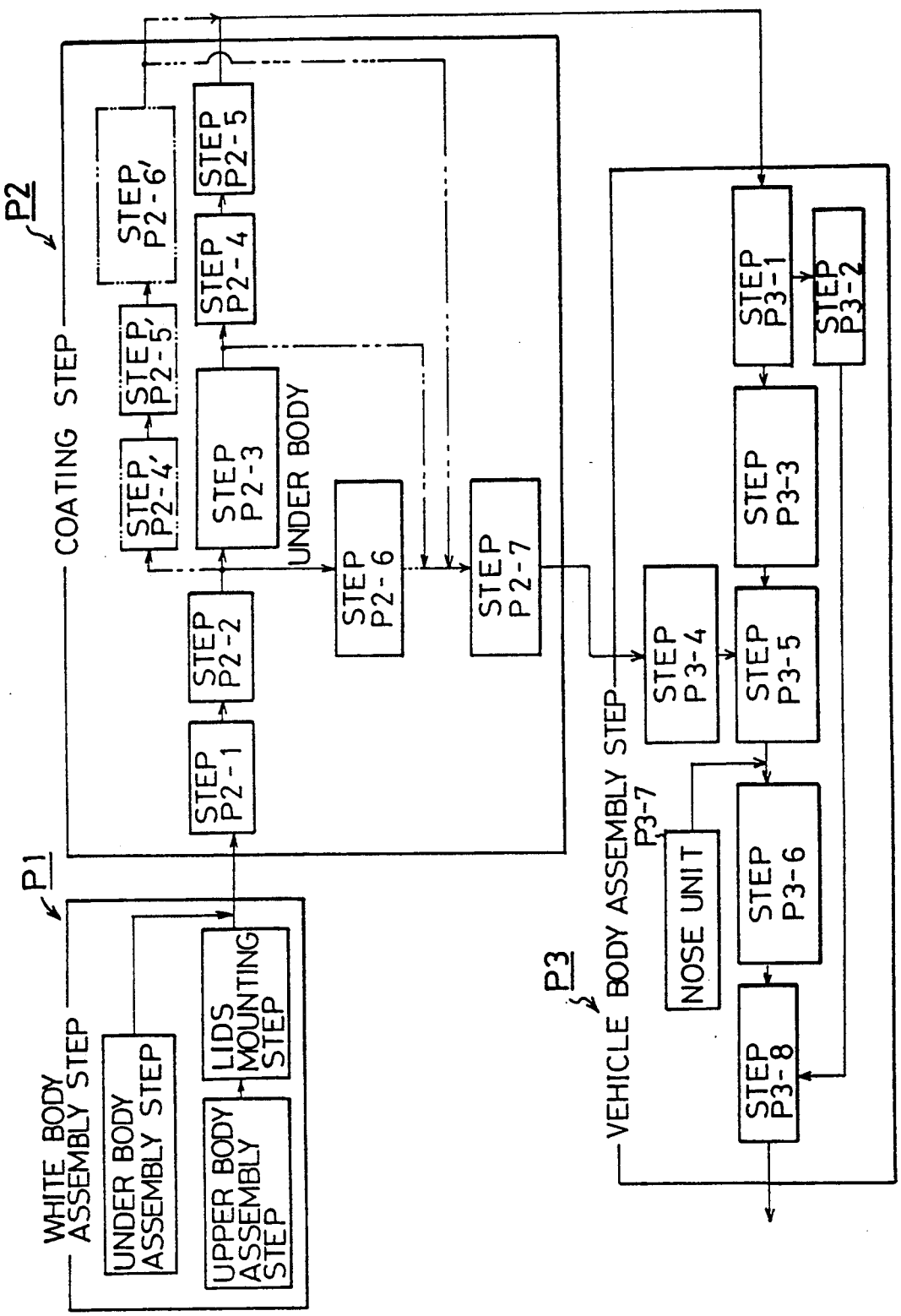

As shown in FIG. 1, the method for the assembly of automotive vehicles basically comprises a press molding step (not shown), a white vehicle body assembly step P1, a coating step P2, and a vehicle body assembly step P3.

White Vehicle Body Assembly Step P1

The white vehicle body assembly step P1 is to assemble vehicle body structuring members into a vehicle body (a white vehicle body) prior to coating. An upper vehicle body section 1 constituting part of the white vehicle body is assembled in a white vehicle body assembly line BL as shown in FIG. 2.

Detailed description will be made of the white vehicle body assembly line BL with reference to FIG. 2.

Figure 2:
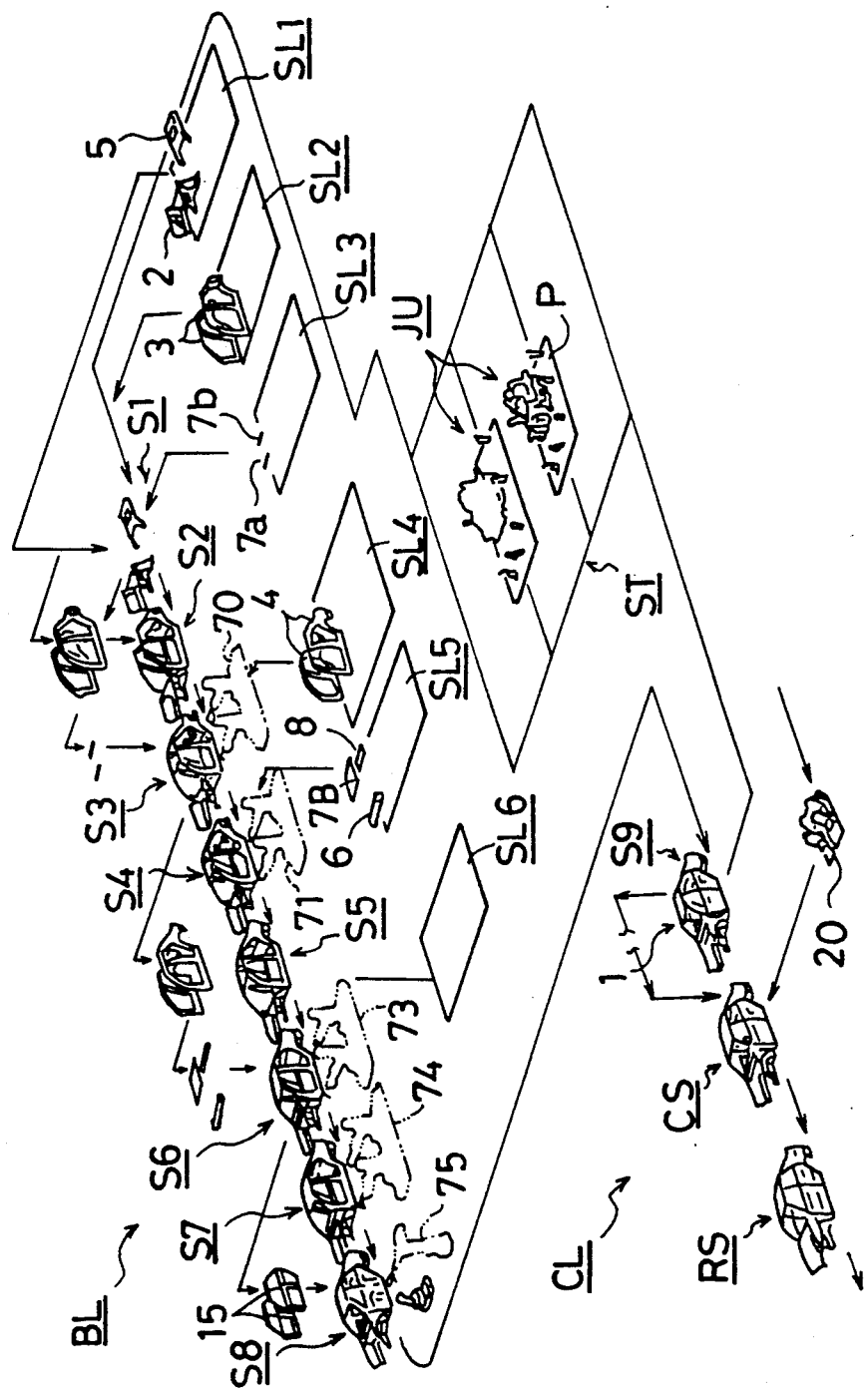

As shown in FIG. 2, the white vehicle body assembly line BL comprises nine stations S1 to S9, inclusive, composed of, from upstream to downstream, a first station S1, a second station S2, a third station S3, a fourth station S4, a fifth station S5, a sixth station S6, a seventh station S7, an eighth station S8 and a ninth station S9. To the stations S1 to S9 are conveyed jig units JU by conveying units, apparatuses or systems (not shown) which are of a general linear, lift or carrier type. In each of the stations S1 to S9, each of the vehicle body sections is aligned with the corresponding jig unit JU by employing its inner panel as a reference and the vehicle body sections mounted to the corresponding jig units JU are connected one after another, thereby forming the vehicle body section (upper vehicle body section) 1.

First, the jig unit JU is described with reference to FIGS. 3 to 6.

The jig unit JU generally comprises a pallet P, a FB clamping mechanism for aligning and clamping a front vehicle body section 2, a RF clamping mechanism for aligning and clamping a rear floor assembly 5, a pair of left-hand and right-hand SP clamping mechanisms, respectively, for aligning and clamping left-hand and right-hand inner side panels 3, a CD clamping mechanism for aligning and clamping a cowl-dash panel unit 6, a pair of forward and rearward RH clamping mechanisms, respectively, for aligning and clamping a front header 7a and a rear header 7b, and a PT clamping mechanism for aligning and clamping a rear package tray assembly 8.

The FB clamping mechanism for aligning and clamping the front vehicle body section 2 comprises an aligning pin 31 and a clamping unit C1, each being mounted to each of two pairs of left-hand and right-hand supporting brackets 30 disposed spaced apart in a predetermined distance at a forward portion of the pallet P of the jig unit JU. The front end portions of left-hand and right-hand front frames of the front vehicle body section 2 as well as both end portions of a second cross-member thereof are aligned with the pallet P with the aid of the four aligning pins 31, and the front vehicle body section 2 is fixed on the pallet P with the aid of the four clamping units C1.

The RF clamping mechanism for aligning and clamping the rear floor assembly 5 comprises an aligning pin 33 and a clamping unit C2, each being mounted to each of two pairs of left-hand and right-hand supporting brackets 32 disposed spaced apart in a predetermined distance at a rearward portion of the pallet P of the jig unit JU. The front and rear end portions of left-hand and right-hand rear frames of the rear floor assembly 5 are aligned with the pallet P with the aid of the four aligning pins 33, and the rear floor assembly 5 is fixed on the pallet P with the aid of the four clamping units C2.

As have been briefly described hereinabove, the left-hand and right-hand SP clamping mechanisms are to align the left-hand and right-hand side inner panels 3 with the pallet P, and they are disposed on left-hand and right-hand sides of a nearly central portion of the pallet P, respectively. Detailed description will be made of the left-hand SP clamping mechanism because the left-hand and right-hand clamping mechanisms are disposed in a symmetrical manner and they have the same structures.

The left-hand SP clamping mechanism generally comprises aligning units PX1, PX2 and PX3 as well as clamping units C3 to C7, inclusive, for aligning and clamping the left-hand inner panel 3, respectively.

The clamping unit C3 is mounted to an upper end portion of each of forward and rearward upright columns 36a of a supporting frame 36 disposed on a supporting plate 35, the supporting frame 36 being in such a shape that capital letter "F" lies with its right-hand open side directed upward. The supporting plate 35 is in turn disposed on a fixing base 34 so as to be movable in left-hand and right-hand directions, as shown in the drawing. The fixing base 34 is in turn disposed on the left-hand side at a nearly lengthwise central position of the pallet P. The clamping unit C3 is disposed to clamp an inner roof rail 9 positioned on a top end of the side inner panel 3.

To the supporting plate 35 are mounted the aligning unit PX1 and the clamping unit C4. The aligning unit PX1 is disposed to align a lengthwise central portion of an inner center pillar 10 of the side inner panel 3 with the pallet P, and the clamping unit C4 is disposed to clamp the inner center pillar 10 thereof.

To a rearward end portion of a horizontal member 36b of the lying F-shaped supporting frame 36 are mounted the aligning unit PX2 and the clamping unit C5. The aligning unit PX2 is arranged to align a lower end portion of an inner rear pillar 11 of the side inner panel 3 with the pallet P, and the clamping unit C5 is arranged to clamp the lower end portion of the inner rear pillar 11 thereof.

Further, the aligning unit PX3 and the clamping unit C6 are mounted to the upper portion of a generally square C-shaped supporting frame 41 disposed on a top portion of an upright column 40 disposed upright on a supporting plate 39. The supporting plate 39 is in turn disposed on a movable plate 38 so as to be movable in left-hand and right-hand directions as shown in the drawing, and the movable plate 38 is supported on a supporting base 37 so as to be movable in forward and rearward directions. The supporting base 37 is disposed on the pallet P and in front of the fixing base 34. The aligning unit PX3 is arranged to align the lower end portion of an inner front pillar 12 of the side inner panel 3 with the pallet P, and the clamping unit C6 is arranged to clamp the inner front pillar 12 thereof. On the other hand, the clamping unit C7 is mounted to a lower portion of the supporting frame 41 for clamping the lower portion of a forward end portion of the side inner panel 3.

As described hereinabove, the side inner panels 3 are aligned with the pallet P with the aid of the aligning units PX1 to PX3 and clamped by the clamping units C3 to C7.

The CD clamping mechanism is arranged to align and clamp the cowl-dash panel unit 6. The CD clamping mechanism comprises an aligning pin 42 and a clamping unit C8, which are disposed on upper portions of the left-hand and right-hand supporting frames 41. The aligning pin 42 and the clamping unit C8 are supported through a cylinder 57 (FIG. 6) so as to be movable in a vertical direction. A rearward end portion of the unit 6 composed of a cowl panel 13 and a lower dash panel 14 is aligned with the pallet P with the aid of the aligning pin 42, and the cowl-dash panel unit 6 is then clamped by the clamping unit C8.

In addition, the RH clamping mechanism comprises an aligning unit PX4a and a clamping unit C9a, each being mounted to each of arm sections 44a positioned in the front of a supporting frame 44 which in turn is interposed between the upper end portions of the forward and rearward upright columns 43 interposed between the left-hand and right-hand fixing bases 34 of the pallet P. The aligning unit PX4a is so disposed as to align an end portion of the front header 7a from below, and the front header 7a is then clamped by the clamping unit C9a.

The supporting frame 44 has a pair of left-hand and right-hand two-branch arm sections 44b disposed at its rearward end, and an aligning unit PX4b and a clamping unit C9b are mounted to a rear end portion of each of the left-hand and right-hand two-branch arm sections 44b. The aligning unit PX4b is arranged to align an end portion of the rear header 7b with the pallet P from below, and the clamping unit C9b is arranged to clamp the rear header 7b.

In other words, the front header 7a is aligned with the pallet P and then clamped, respectively, with the aid of a pair of the aligning units PX4a and a pair of the clamping units C9a, and the rear header 7b is aligned with the pallet P and then clamped, respectively, with the aid of a pair of the aligning units PX4b and a pair of the clamping units C9b.

Furthermore, an aligning unit PX5 and a clamping unit C10 are mounted to an end portion of each of left-hand and right-hand arm sections 44c positioned at a central portion of the supporting frame 44. The aligning unit PX5 is arranged for aligning an end portion of a roof bow 7c assembled with a roof outer panel 7B, and the clamping unit C10 is for clamping the roof bow 7c.

The clamping units C1 to C10, inclusive, are of a conventional toggle type and each of them comprises a clamping lever 45 of a nearly crank form and an air cylinder 46 for driving a pivotal movement of the clamping lever 45.

The aligning units PX1 to PX5, inclusive, are of a general configuration having an aligning pin 47 and an air cylinder 48 for driving forward and rearward movement of the aligning pin 47.

Figure 7:
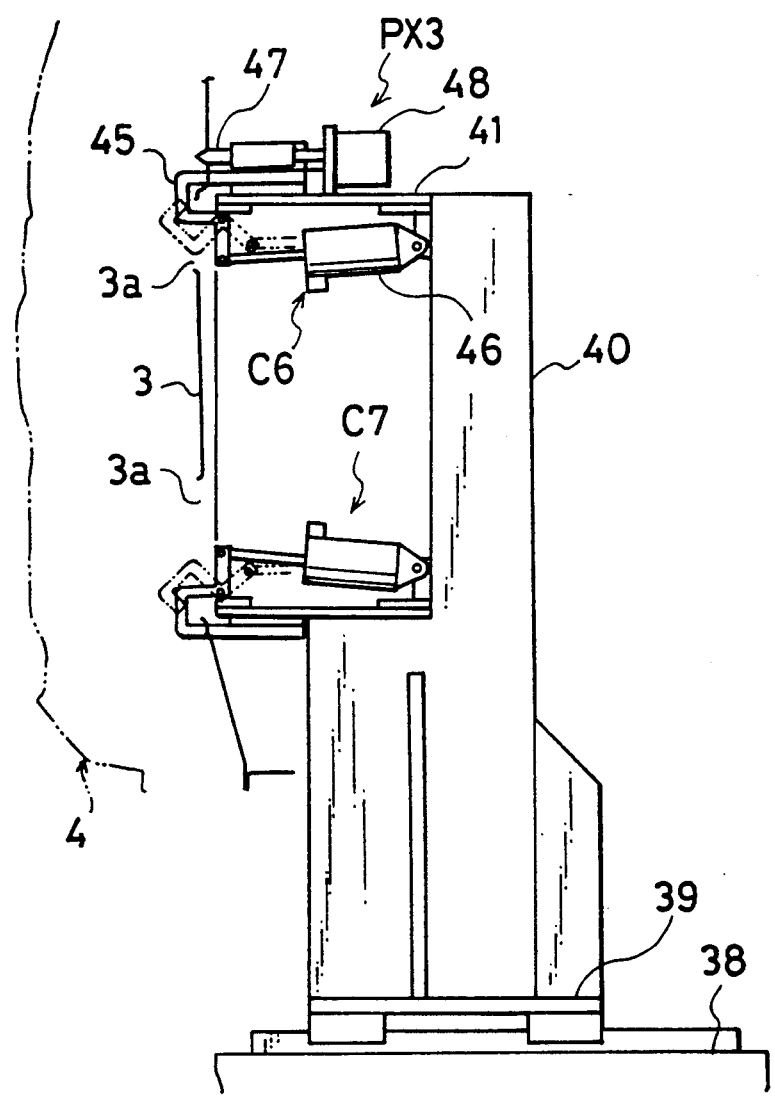

It is noted herein that, as shown in FIG. 7, the clamping units C6 and C7 for the SP clamping mechanism are so arranged as to clamp the side inner panel 3 by inserting the respective clamping levers 45 through an opening section 3a formed in the side inner panel 3.

The PT clamping mechanism comprises four aligning pins 55 and two pairs of forward and rearward clamping units C11, respectively, for aligning a rear package tray assembly 8 with the pallet P and then clamping the assembly 8. Each of the clamping units C11 is a clamping unit of a conventional toggle type having a pair of forward and rearward clamping levers 56a and an air cylinder 56 for driving the pivotal movement of the clamping levers 56a. A pair of the aligning pins 55 and the clamping unit C11 are mounted to each of left-hand and right-hand supporting brackets 52, each extending rearward and connected to a movable plate 53 that in turn is disposed on a rearward side of a supporting member 51 and supported so as to be movable in a vertical direction with the aid of a cylinder 54. The supporting member 51 is in turn supported on a supporting plate 50 so as to be movable in forward and rearward directions, and the supporting plate 50 is in turn disposed on an upper rearward surface bridging the left-hand and right-hand fixing bases 34.

The clamping units C3 to C5 and the aligning units PX1 and PX2 are mounted to the jig unit JU through the supporting frame 36, and the clamping units C6 to C8, the aligning units PX3 and the aligning pin 42 are mounted to the jig unit JU through the upright columns 40, the movable plate 38 and the supporting plate 39. Further, the clamping units C11 and the aligning pin 55 are mounted to the jig unit JU through the supporting member 51 and the movable plate 53.

Figure 4:
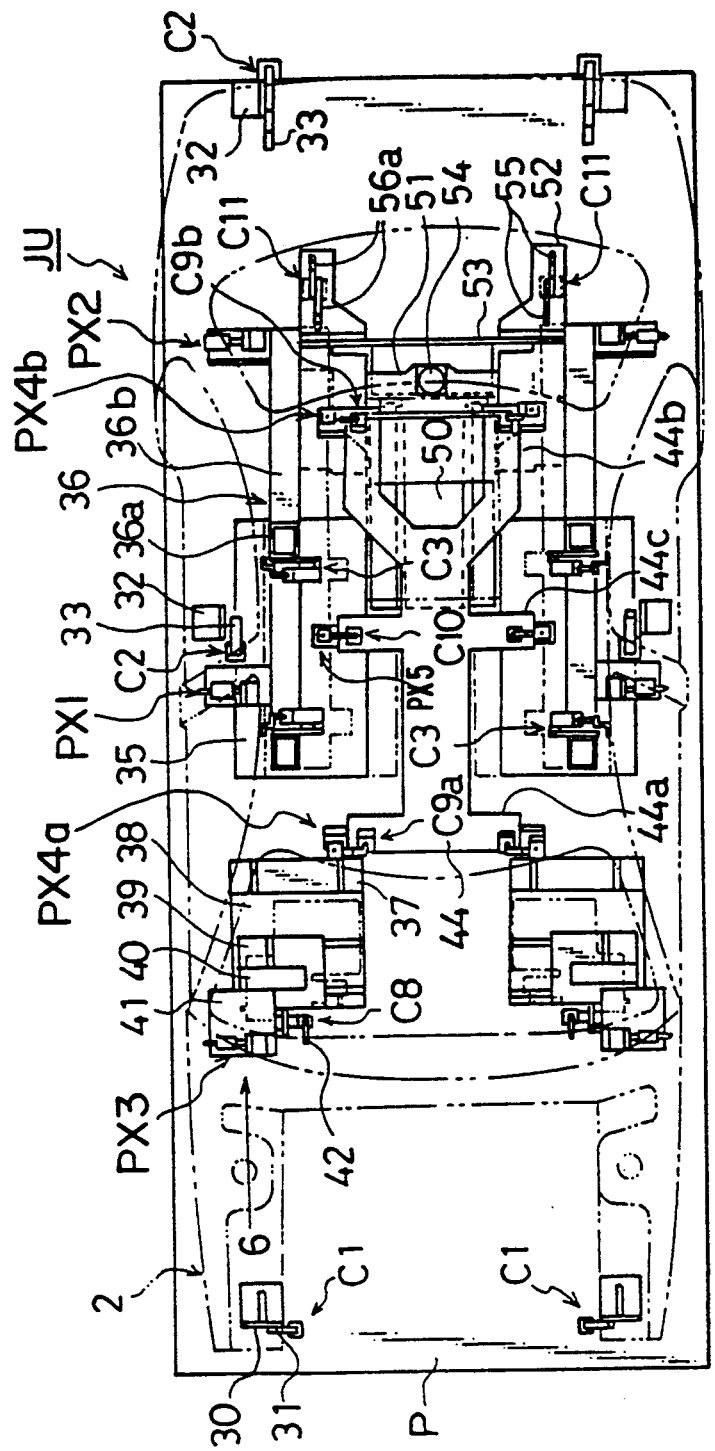

As shown in FIG. 4, the aligning units and the clamping units are transferred by a driving mechanism (not shown) to the mounting position, as indicated by the solid line, when the vehicle body structuring members are mounted to the jig unit JU. On the other hand, the aligning units and the clamping units are transferred to the evacuating position, as indicated by the phantom line, so as to allow the jig unit JU to be evacuated from the floor opening section 1a (FIG. 6) without causing the jig unit JU to interfere with the upper vehicle body section, when the upper vehicle body section has been assembled.

Then, description will now be made of the vehicle body structuring members to be supplied to the white vehicle body line BL with reference to FIG. 2.

The front vehicle body section 2 comprises left-hand and right-hand front frames, left-hand and right-hand wheel aprons, a lower dash panel, a lower dash member (a second cross-member), and so on, and the front vehicle body section 2 is assembled in a first sub-line SL1. It is to be noted herein that a shroud panel constituting a front end of the vehicle body section is likewise assembled after the upper vehicle body section is assembled with the under vehicle body section and an internal combustion engine has been loaded on or to the vehicle body 1.

The rear floor assembly 5 comprises a rear floor panel, left-hand and right-hand rear frames, a fourth cross-member, a rear cross-member, a trunk floor, and a rear end panel, and the rear floor assembly 5 is assembled in the first sub-line SL1.

Each of the left-hand and right-hand side inner panels 3 comprises an inner panel body, an inner roof rail, an impact bracket, a wheel housing, suspension reinforcing members and so on. The side inner panel 3 is assembled in a second sub-line SL2.

The front header 7a and the rear header 7b, serving as roof inner members of the roof panel, comprise each a header inner panel and a header outer panel, and they are assembled in a third sub-line SL3.

Each of the left-hand and right-hand side outer panels 4 comprises an outer panel body, a front hinge reinforcing member, a rear hinge reinforcing member, a center pillar reinforcing member, a rear striker reinforcing member, a corner plate and so on. The side outer panel 4 is assembled in a fourth sub-line SL4.

The roof outer panel 7B comprises an outer panel body and a roof bow 7c, and the rear package tray assembly 8 comprises a package tray, a bracket and so on. Further, the cowl-dash panel unit 6 comprises the cowl panel and the dash panel. These members are assembled in a fifth sub-line SL5.

The lid members comprise a bonnet and a trunk lid, and they are assembled in a sub-line (not shown). Each of four side doors 15 comprises a door inner panel, a door outer panel, a sash, a window glass panel, a window regulator and so on, and they are assembled in a sixth sub-line SL6.

Now, description is made of the procedures for assembling the upper vehicle body section 1 of the white vehicle body section with reference to FIGS. 2 and 8 to 13. The operations for the assembly of the upper vehicle body section in each of the stations S1 to S9 are described in the order from upstream to downstream. In FIG. 2, the jig unit JU is excluded from the illustration and the stations S2 to S7 correspond to plural joining stations.

First station S1

Figure 8:
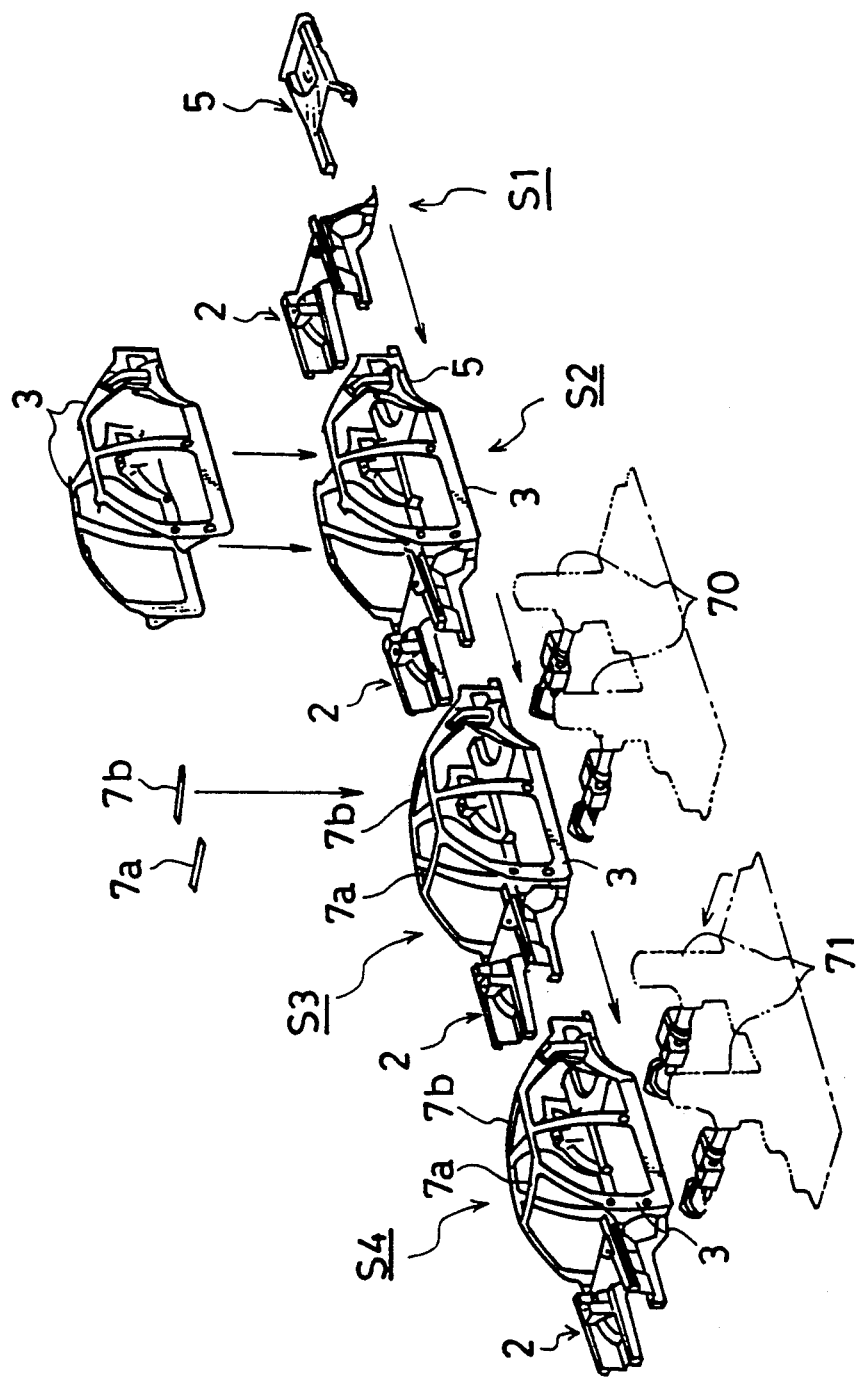

In the first station S1, as shown in FIG. 8, the jig unit JU conveyed from a jig stock station ST is positioned and the front vehicle body section 2 and the rear floor assembly 5 are aligned with the pallet P of the jig unit JU and then clamped by the jig unit JU. The front vehicle body section 2 and the rear floor assembly 5 are supplied from the first sub-line SL1.

Figure 3:
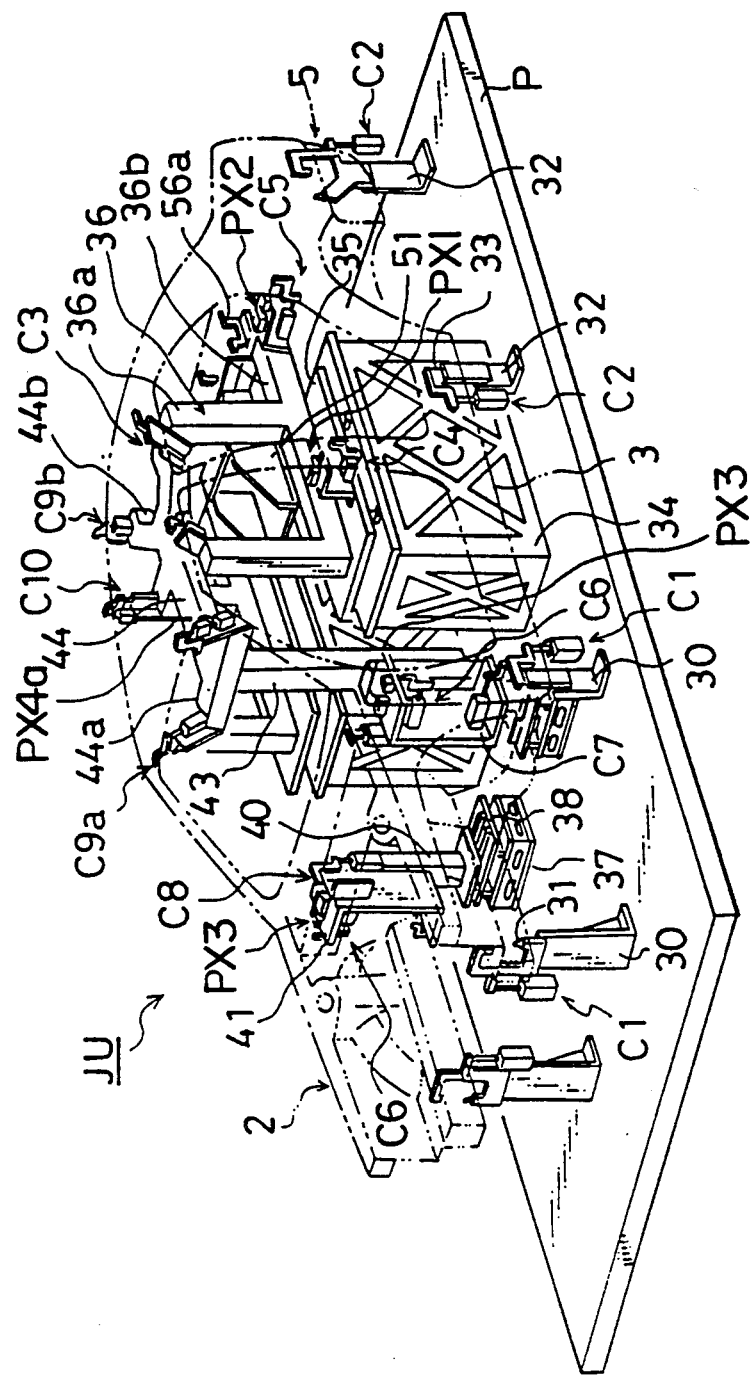

As shown in FIG. 3, the front vehicle body section 2 is aligned with the jig unit JU with the aid of the four aligning pins 31 with high accuracy and then clamped by the four clamping units C1 of the jig unit JU. Further, the rear floor assembly 5 is aligned with the jig unit JU with the four aligning pins 33 with high accuracy and then clamped by the four clamping units C2 of the jig unit JU.

Second station S2

In the second station S2, as shown in FIG. 8, the jig unit JU conveyed from the first station S1 is aligned. The left-hand and right-hand side inner panels 3 are supplied from the second sub-line SL2 to the second station S2 and then aligned with the jig unit JU with high accuracy with the aid of the aligning units PX1 to PX3, inclusive. Thereafter, they are clamped with the clamping units C3 to C7, inclusive.

Brief description will now be made of a carrier system 60 for conveying the left-hand and right-hand side inner panels 3 to the second station S2 from the first station S1.

Figure 11:
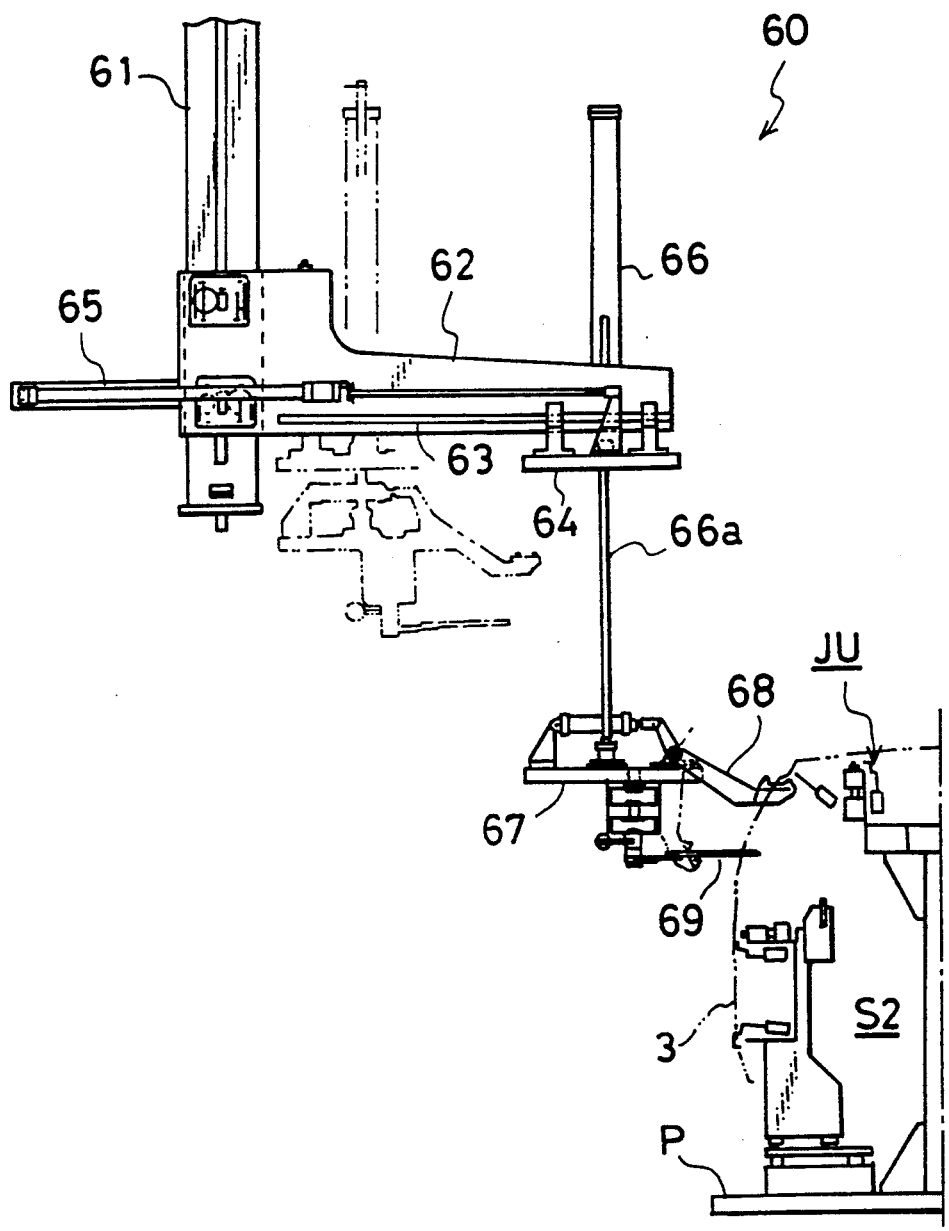

As shown in FIG. 11, a guide rail (not shown) is provided in a region over the downstream end portion of the second sub-line SL2 and in a region over the second station S2. To the guide rail are mounted left-hand and right-hand upright frames 61 extending downward and disposed so as to be movable. Each of the upright frames 61 supports an arm 62 in an overhung state so as to be movable in a vertical direction, and the arm is elevated or lowered with the aid of a mechanism for driving the elevation or lowering of the arm, although not shown, disposed on an upper end portion of the upright frame 61.

To a side surface of each of the arms 62 is mounted a horizontally extending guide rail 63 which in turn supports a base plate 64 to be operatively driven by a cylinder 65 so as to be movable in left-hand and right-hand directions, as shown in the drawing. To the base plate 64 is a cylinder 66 extending in a vertical direction, and a movable plate 67 is mounted to the lower end portion of a piston rod 66a of the cylinder 66. To the movable plate 67 are pivotally mounted a supporting arm 68 so disposed as to be inserted into a door opening section of each of the side inner panels 3 and an arm 69 disposed pivotally so as to prevent the side inner panel 3 from swinging. The side inner panel 3 is supported by the movable plate 67 through the supporting arm 68 and it is conveyed from the first station S1 to the second station S2 with the side inner panel 3 held on the arm 69 which prevents the side inner panel 3 from swinging during conveyance.

Third station S3

In the third station S3, as shown in FIG. 8, the front header 7a and the rear header 7b are supplied from the third sub-line SL3 and are mounted to the jig unit JU that has already been aligned.

Figure 5:
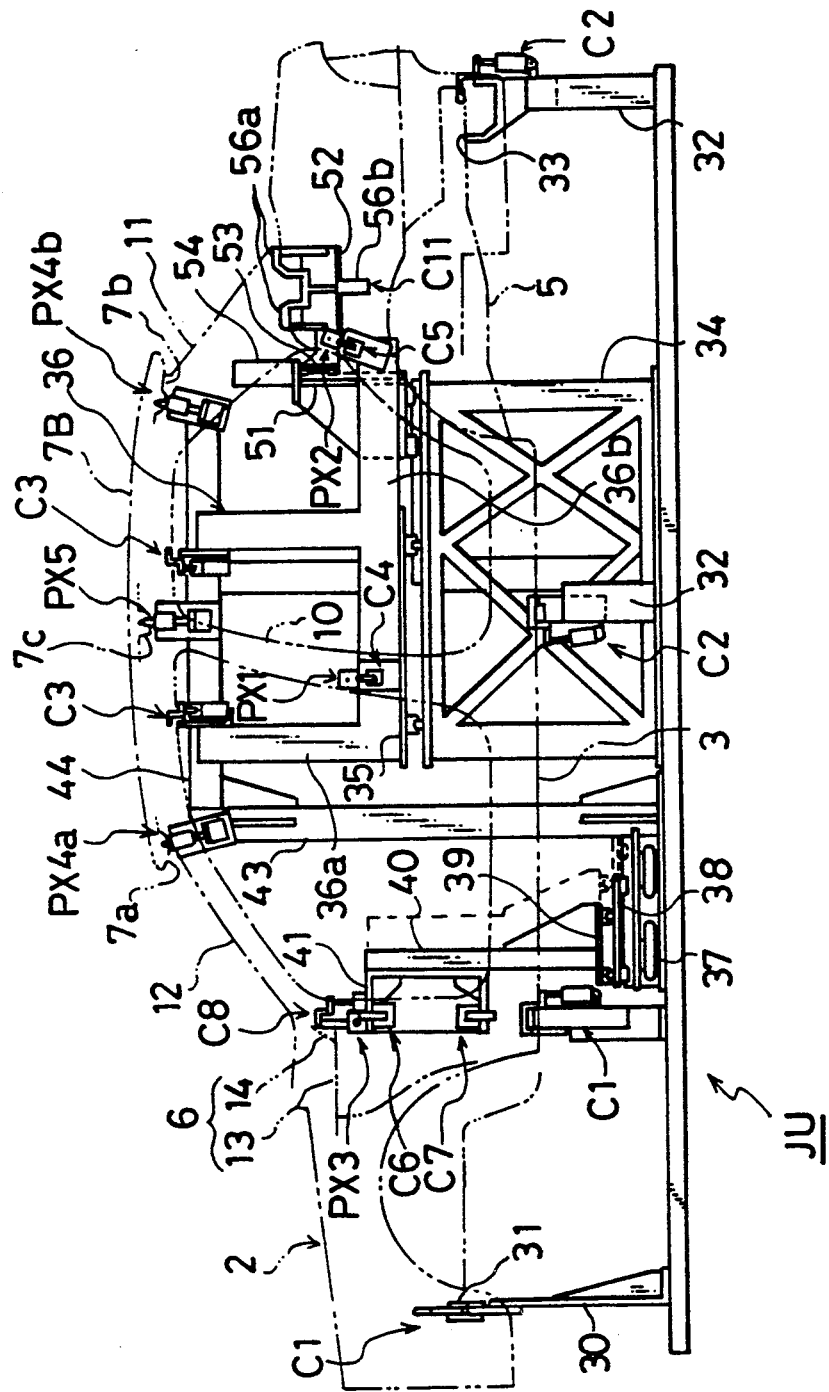
Figure 6:
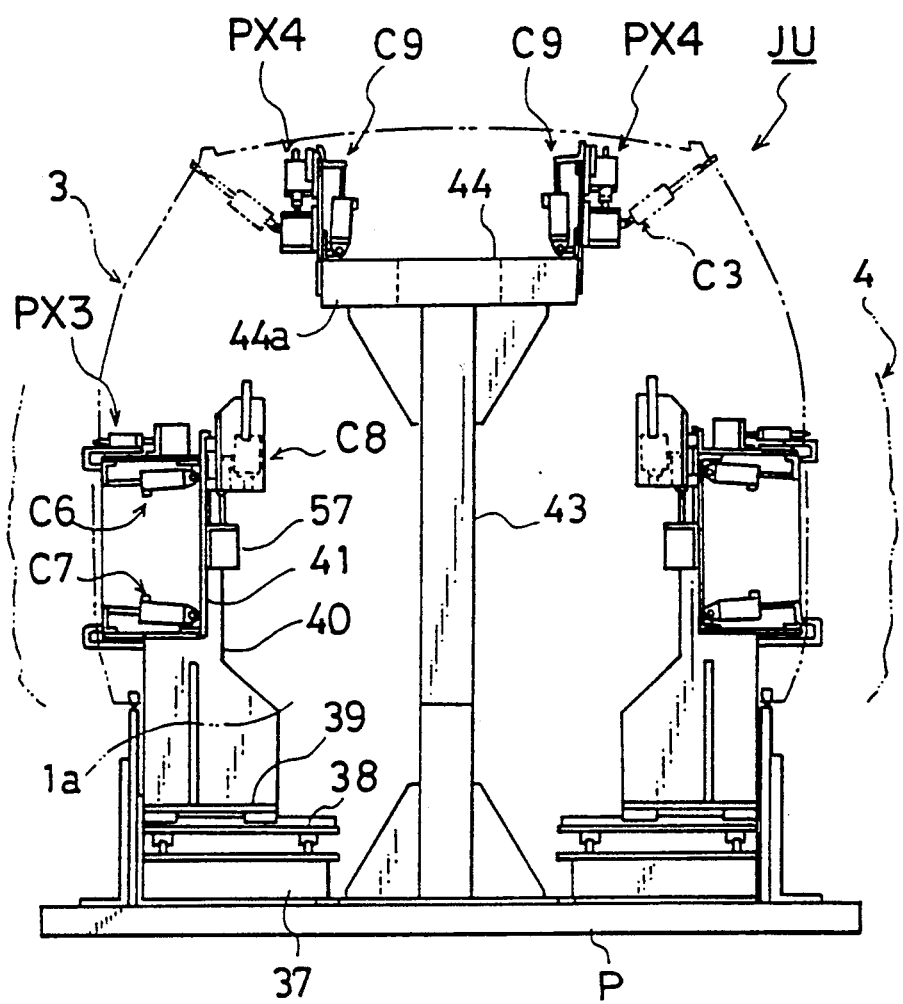

As specifically shown in FIG. 5, the front header 7a and the rear header 7b are aligned with the pallet P with the aid of the aligning units PX4a and PX4b and then clamped by the clamping units C9a and C9b, respectively, with high accuracy, followed by temporarily welding the both side end portions of each of the front header 7a and the rear header 7b to the left-hand and right-hand side inner panels 3 with the aid of two welding robots 70. Further, the side inner panel 3 is temporarily welded to the front vehicle body section 2 and the rear floor assembly 5.

Fourth station S4

In the fourth station S4, as shown in FIG. 8, the left-hand and right-hand side inner panels 3 are further welded to the front vehicle body section 2 and the rear floor assembly 5 with the aid of another two welding robots 71. Further, the front header 7a and the rear header 7b are welded to the left-hand and right-hand side inner panels 3.

Fifth station S5

Figure 9:
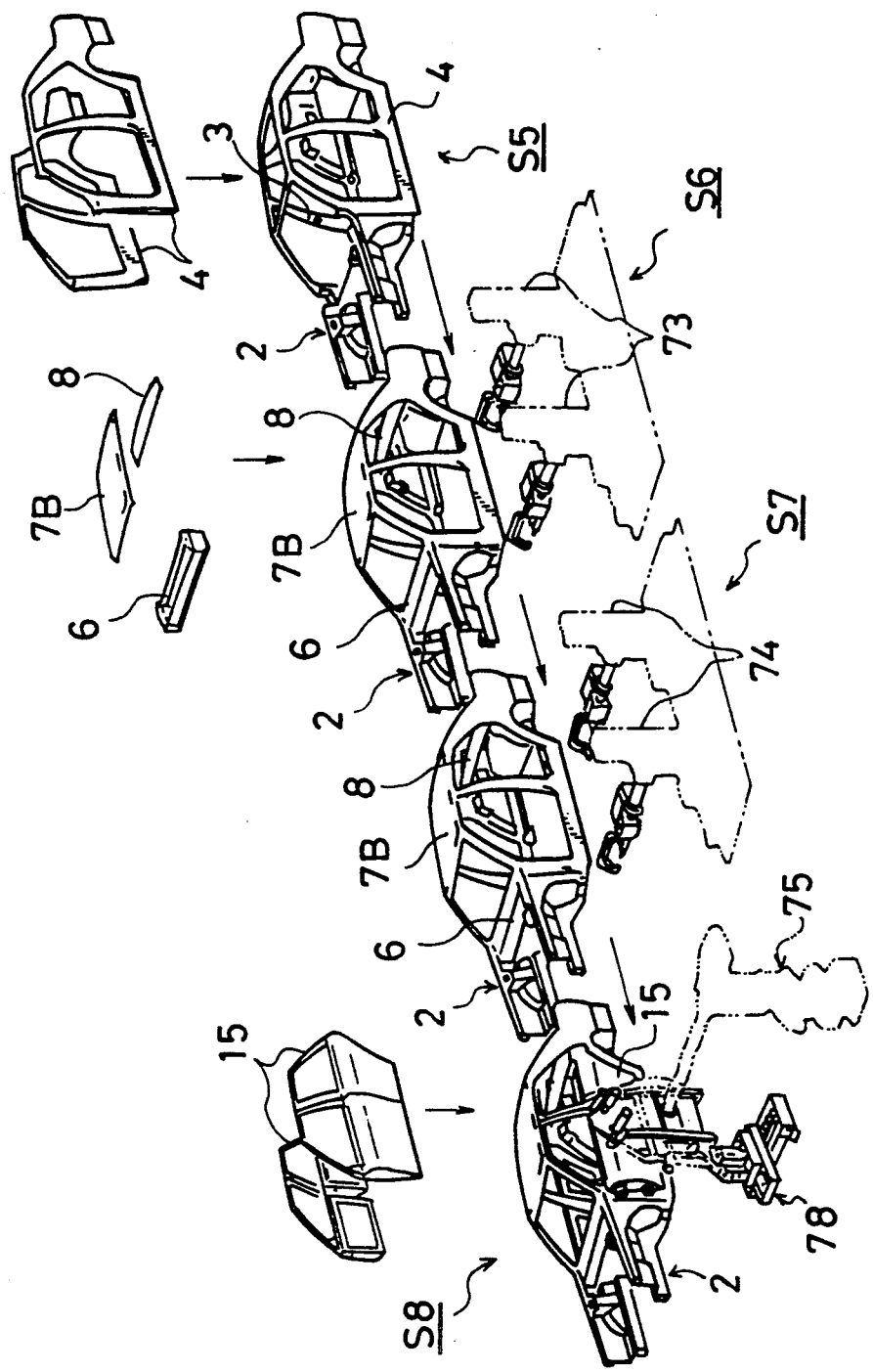

In the fifth station S5, as shown in FIG. 9, the left-hand and right-hand side outer panels 4 are supplied from the fourth sub-line SL4 to the fifth station S5 as well as aligned with and fixed to the left-hand and right-hand side inner panels 3 fixed to the jig unit JU.

Sixth station S6

In the sixth station S6, as shown in FIG. 9, the roof outer panel 7B, the cowl-dash panel unit 6, and the rear package tray assembly 8 are supplied from the fifth sub-line SL5 and mounted to the jig unit JU.

As shown in FIGS. 4 and 5, the roof outer panel 7B is aligned with the jig unit JU with the aid of the aligning units PX5 with high accuracy and then mounted to the jig unit JU with the aid of the clamping units C10. Further, the cowl-dash panel unit 6 is aligned with the jig unit JU with the aid of the aligning pin 42 with high accuracy and then fixed to the jig unit JU with the aid of the clamping units C8. In addition, the rear package tray assembly 8 is aligned with the jig unit JU with the aid of the aligning pins 55 with high accuracy and then clamped with the jig unit JU with the aid of the clamping units C11.

Thereafter, the side outer panel 4 is welded temporarily to the side inner panel 3 with the aid of the two welding robots 73. Likewise, the cowl-dash panel unit 6 is welded temporarily to the side inner panel 3 and the front vehicle body section 2. Further, the roof outer panel 7B is temporarily welded to the front and rear headers 7a and 7b as well as to the side outer panel 4. In addition, the rear package tray assembly 8 is temporarily welded to the side inner panel 3 and the rear floor assembly 5.

Seventh station S7

In the seventh station S7, as shown in FIG. 9, the vehicle body structuring members welded temporarily in the sixth station S6 and conveyed to the seventh station S7 therefrom are further welded with the aid of two welding robots 74.

Eighth station S8

Figure 12:
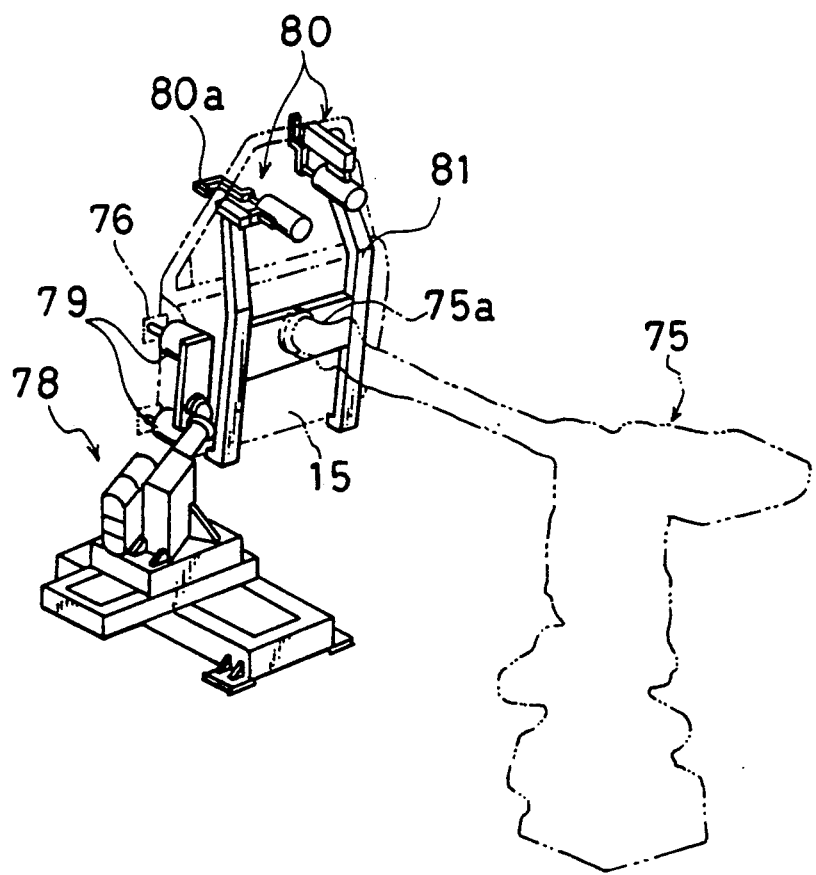

In the eighth station S8, as shown in FIGS. 9 and 12, front and rear side doors 15 are supplied one after another from the sixth sub-line SL6 with the aid of left-hand and right-hand robots 75. The side doors 15 are temporarily mounted to the corresponding side outer panels 4 by coupling a pair of upper and lower hinge members 76 disposed on the side doors 15 with nut runners 79 of a coupling unit 78.

The robot 75 is of a conventional multi-joint structure and, more specifically, it has a hand 75a to which is mounted a frame member 81 through a pair of toggle clamping units 80 disposed so as to allow their clamping levers 80a to be inserted through a window opening section into the side inner door 15 and to hold the door sash. Likewise, the lid members such as the bonnet and the trunk lid are temporarily mounted to the vehicle body section 1 in the eighth station S8.

Ninth station S9

Figure 10:
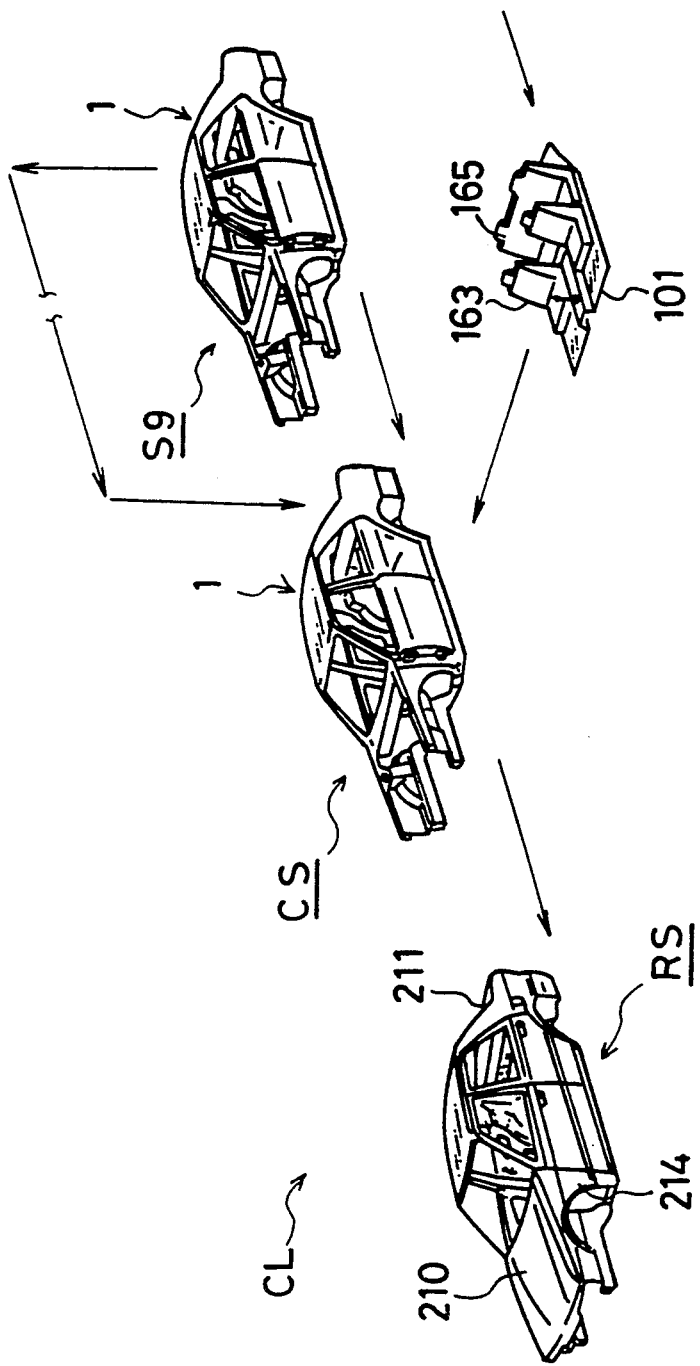
Figure 13:
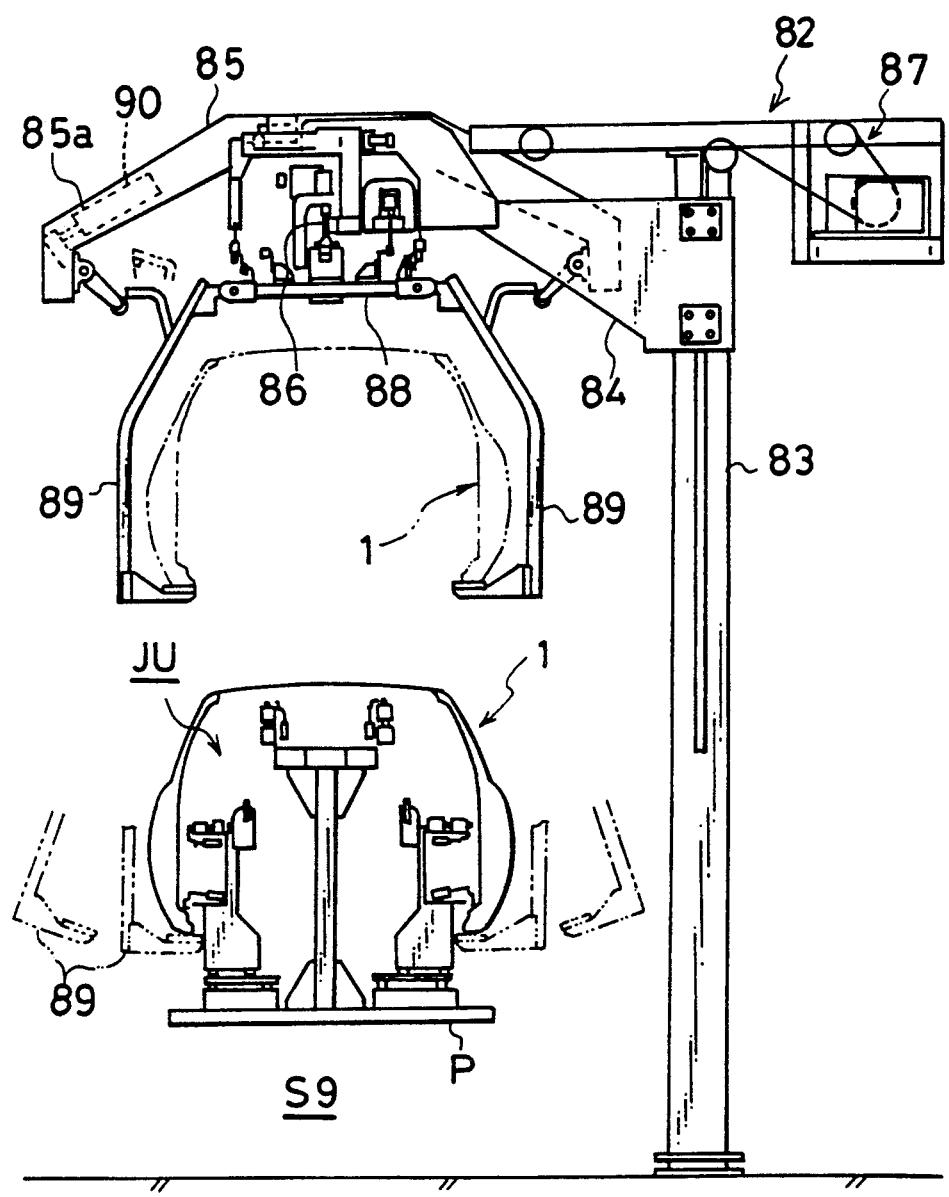

In the ninth station S9, as shown in FIGS. 10 and 13, the vehicle body section 1 assembled through the first station S1 to the eighth station S8 is lifted with the aid of a lifting-lowering unit 82, thereby allowing the jig unit JU to be evacuated and removed downward from the vehicle body section 1. Thereafter, the jig unit JU is transferred to the stock station ST and the vehicle body section 1 is transferred to a coating step P2, as will be described hereinafter, where the vehicle body section 1 is coated with coating paints as needed. After coating, the vehicle body section 1 is conveyed and transferred to a transferring station CS of the vehicle body assembly line CL.

Figure 14:
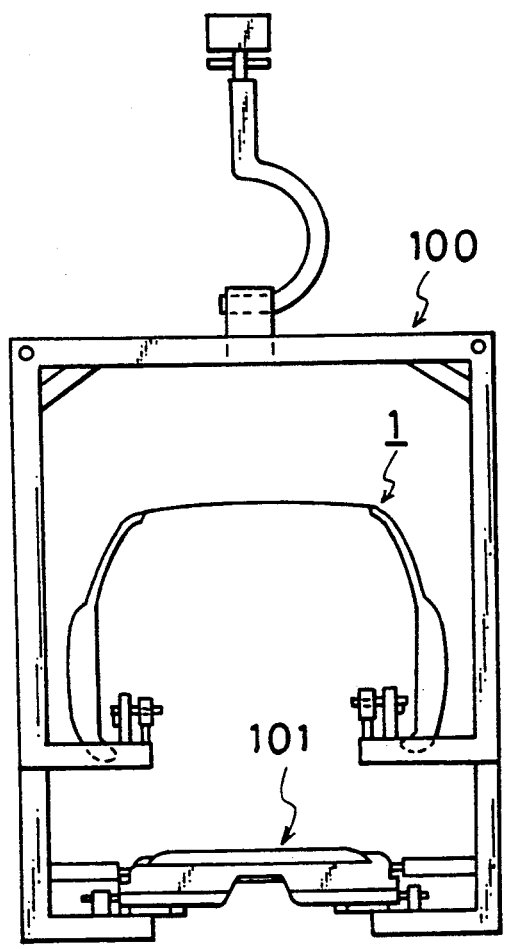
Figure 15:
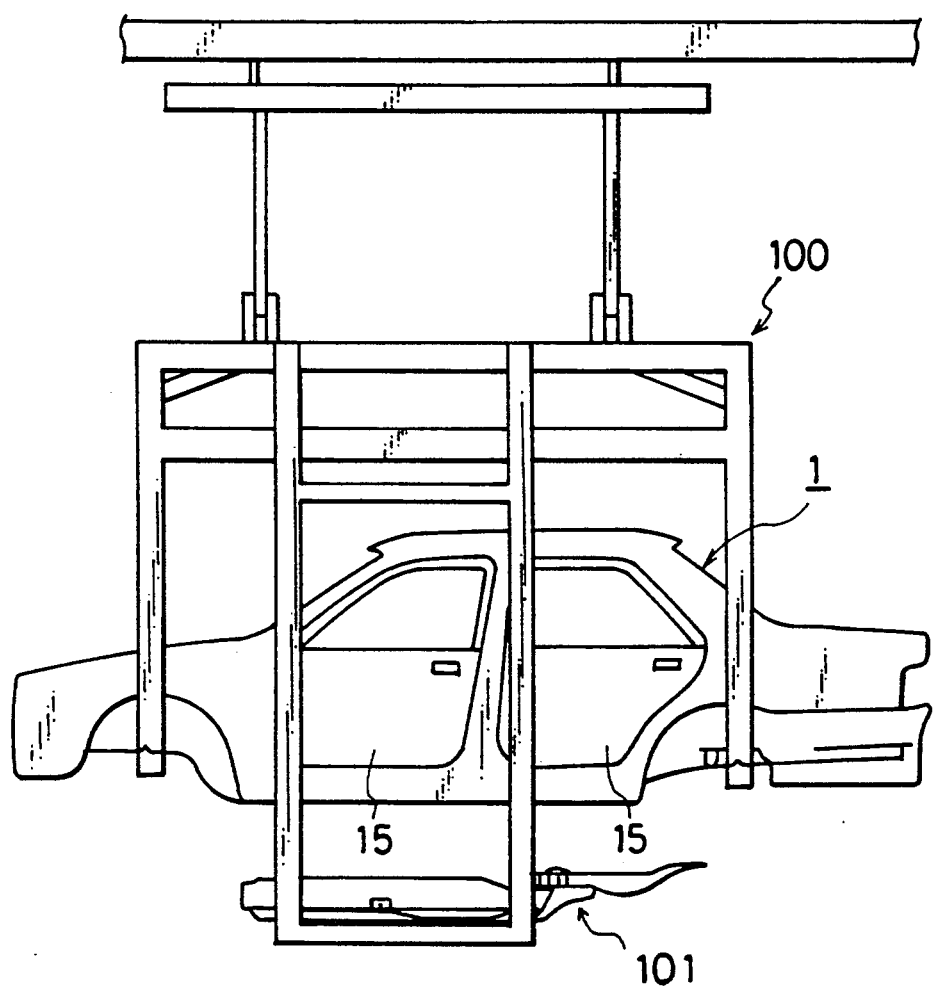

As shown in FIGS. 14 and 15, the white vehicle body (upper vehicle body section) 1 is loaded in a middle position of a hanger conveyor 100 and an under vehicle body section 101 is loaded in a lower position thereof, and the upper vehicle body section 1 and the under vehicle body section 101 are conveyed in this state with the aid of the hanger conveyor 100 into the coating step P2. The upper vehicle body section 1 and the under vehicle body section 101 are combined with each other into one vehicle body.

As described hereinabove, the method according to the present invention can mount the body side inner panels 3 and the body side outer panels 4 as well as the roof panels to the vehicle body section after they have been aligned with the jig unit JU and then fixed thereto. Hence, unlike the conventional assembly methods, the present invention requires no brackets, stays, bolts and so on to be mounted to the panels for mounting the panels to the vehicle body sections, thereby simplifying the structures of the panels. Further, the present invention can omit the steps for temporarily assembling part of the vehicle body section, unlike the conventional methods, thereby simplifying the whole outline of the steps for the vehicle body assembly method.

In addition, as the jig unit JU is for exclusive use with the upper vehicle body section 1, i.e. as the jig unit JU is arranged to be applicable only to the vehicle body section with no floor panel mounted thereto, the jig unit JU can be evacuated or removed from the floor opening section of the upper vehicle body section 1 after completion of the assembly of the upper vehicle body section 1. Hence, as long as the jig unit JU can be evacuated or removed from the floor opening section of the upper vehicle body section 1, the jig unit JU can be made so large in size that functional units can be disposed as much as possible on the jig unit JU, thereby making the functions of the jig unit JU as multiple as possible and adding those functions to the jig unit JU with ease and, eventually, assembling the upper vehicle body section 1 with high accuracy and efficiency.

Coating Step P2

Description will be made of the coating of the upper vehicle body section 1 and the under vehicle body section 101 with coating paints with reference to FIG. 1. It is to be noted herein that the coating itself in the coating step is conventional and well known in the art, so that detailed description on the coating itself will be omitted from the following description.

The coating step P2 roughly comprises, as a first route of the coating process, a chemical conversion treatment step P2-1, an undercoating step P2-2, a protective film coating step P2-3, an intermediate coating step P2-4 and an overcoating step P2-5, followed by proceeding to a vehicle body assembly step P3. As a second route of the coating process, the coating step P2 comprises, in addition to the steps P2-1 and P2-2, a protective film coating step P2-6 and an under vehicle body section processing step P2-7, followed by proceeding to the vehicle body assembly step P3. As a third route of the coating process, the coating step P2 comprises, in addition to the steps P2-1 and P2-2, an intermediate coating step P2-4', an overcoating step P2-5' and a protective film coating step P2-6', followed by proceeding to the step P2-7 or to the vehicle body assembly step P3. As a variant of the first coating route, the under vehicle body section processing step P2-7 can be implemented subsequent to the step P2-3. It is to be noted herein that the coating process route may be chosen depending upon the vehicle body sections to be coated as needed. For example, the invisible vehicle body sections are not required to be coated in the same manner as the visible vehicle body sections, so that the invisible vehicle body sections need not be coated with any intermediate coating paint and any overcoating paint. With this taken into account, the coating process route can be chosen in an appropriate manner.

In the chemical conversion treatment step P2-1, the upper vehicle body section 1 and the under vehicle body section 101 loaded on the hanger conveyor 100 are degreased with, for example, an alkali degreasing agent and then formed with a chemical film with a zinc phosphate type agent on the surfaces of the upper vehicle body section 1 and the under vehicle body section 101 by means of continuously spraying procedures. The upper vehicle body section 1 and the under vehicle body section 101 are then washed well with water.

In the undercoating step P2-2, the upper vehicle body section 1 and the under vehicle body section 101 are immersed in a coating paint vessel containing, for example, an epoxy-type paint for electrodeposition, while they are loaded on the hanger conveyor 100. The cationic electrodeposition is then carried out by employing the upper vehicle body section 1 and the under vehicle body section 101 as a cathode by applying the voltage of 200 to 400 volts. After the electrodeposition, the vehicle body sections are washed well with water and then baked at 170° C. for 25 minutes.

As described hereinabove, the upper vehicle body section 1 and the under vehicle body section 101 are treated in the step P2-1 and the step P2-2, while they are loaded on the hanger conveyors 100, so that the structures of the coating line and/or the conveying unit for conveying the vehicle body sections, including the hanger conveyors 100, can be made simple. This is advantageous in terms of the economy of equipment. Further, this system can reduce the quantity of the paints to adhere to the vehicle body sections and to be wasted, so that it is advantageous in terms of running costs.

The under vehicle body section 101 is then evacuated from the hanger conveyor 100 and transferred to a conveying apparatus (not shown), followed by processing the under vehicle body section 101 in steps different from the steps at which the upper vehicle body section 1 is processed and then by conveying the under vehicle body section 101 separately from the upper vehicle body section 1 to the vehicle body assembly step P3.

On the other hand, the upper vehicle body section 1 is then conveyed to the protective film coating step P2-3. In the step P2-3, outer faces at the lower portion of the upper vehicle body section 1, at the lower portion of the side door 15, and at a lower rear end portion of the front fender, and so on are sprayed with an anti-chipping paint, such as a urethane type paint or a PVC type paint, to give a protective film having the thickness of 100 to 200 microns.

The upper vehicle body section 1 is then conveyed to the intermediate coating step P2-4. In the step P2-4, the upper vehicle body section 1 is grounded and, for example, an epoxy ester type paint is charged with electricity at the volume of −60 kV to −90 kV, thereby implementing the electrostatic coating. After coating, the upper vehicle body section 1 is set for 5 to 10 minutes to evaporate the volatile ingredients contained in the intermediate coat formed on the upper vehicle body section 1, followed by baking at 140° C. to 150° C. for 20 to 25 minutes.

After the step P2-4, the upper vehicle body section 1 is then conveyed to the overcoating step P2-5. In the step P2-5, the upper vehicle body section 1 is grounded and, for example, a melamine-alkyd resin type paint or an acrylic resin type paint is charged with electricity at the volume of −60 kV to −90 kV, thereby implementing the electrostatic coating. After coating, the upper vehicle body section 1 is set for 5 to 10 minutes to evaporate the volatile ingredients contained in the over coat formed thereon and baked at 140° C. to 150° C. for 25 minutes.

On the other hand, the under vehicle body section 101 is conveyed to the protective film coating step P2-6 after the undercoating step P2-2 and the removal or evacuation from the hanger conveyor 100. In the step P2-6, the under vehicle body section 101 is sprayed on its bottom surface with, for example, an anti-chipping paint such as a urethane type paint or a PVC type paint. After coating, the anti-chipping coat formed thereon is dried to form an anti-chipping film having the thickness of approximately 100 microns to 200 microns.

After the step P2-6, the under vehicle body section 101 is conveyed to the under vehicle body section processing step P2-7, for example, where the under vehicle body section 101 is filled at its necessary positions with a sealing agent and where holes formed in the under vehicle body section 101 are covered with hole coverings, as needed.

Variants of the coating step P2 will be described. As shown in FIG. 1, the upper vehicle body section 1 and the under vehicle body section 101 are coated with a protective film coating paint in the step P2-3, while they are loaded on the hanger conveyor 100, and then the under vehicle body section 101 is evacuated or removed from the hanger conveyor 100, followed by conveying the under vehicle body section 101 to the step P2-7 where the under vehicle body section 101 is processed in the same manner as described hereinabove. This variant corresponds to the route as indicated by two-dots-and-dash line in FIG. 1 and can be applied depending upon the models and/or specifications of the automotive vehicles. Further, another variant, as indicated by three-dots-and-dash line in FIG. 1, involves the evacuation or removal of the under vehicle body section 101 from the hanger conveyor 100 after the steps P2-4', P2-5' and P2-6', followed by conveying the under vehicle body section 101 to the step P2-7 where the under vehicle body section 101 is processed in the same manner as described hereinabove.

Vehicle body assembly step P3

The vehicle body assembly step P3 comprises a step P3-1 for removing the lid members from the upper vehicle body section 1 coated in the coating step P2 and then transferred from the coating step P2, a step P3-2 for mounting parts to the lid members removed from the upper vehicle body section 1, a step P3-3 for mounting various parts to the upper vehicle body section 1 from which the lid members have been removed, a step P3-4 for mounting various parts to the under vehicle body section 101 coated and processed in the coating step P2 as well as transferred from the step P2-7, a step P3-5 for assembling the upper vehicle body section 1 with the under vehicle body section 101, a step P3-6 for mounting lower parts unit to the vehicle body section assembly combined in and conveyed from the step P3-5, and a step P3-8 for mounting the lid members supplied from the step P3-2 to the vehicle body section assembly resulting from the step P3-6.

After the vehicle body section has been separated into the upper vehicle body section 1 and the under vehicle body section 101 in the coating step P2, the upper vehicle body section 1 is first conveyed to the step P3-1 to remove the lid members such as the bonnet 210, the trunk lid 211, the left-hand and right-hand side doors 15 as well as the left-hand and right-hand front fenders 214. The lid members removed from the upper vehicle body section 1 are then conveyed to the step P3-2 where they are coated with an anti-rust oil, etc. and moldings and rubbers are mounted to the lid members, followed by mounting various parts such as wire-harnesses, lamps and so on.

As described hereinabove, the lid members removed from the upper vehicle body section 1 are processed and mounted with the various parts on the exclusive mounting line, thereby improving efficiency of the mounting operations to an extremely great extent.

Figure 16:
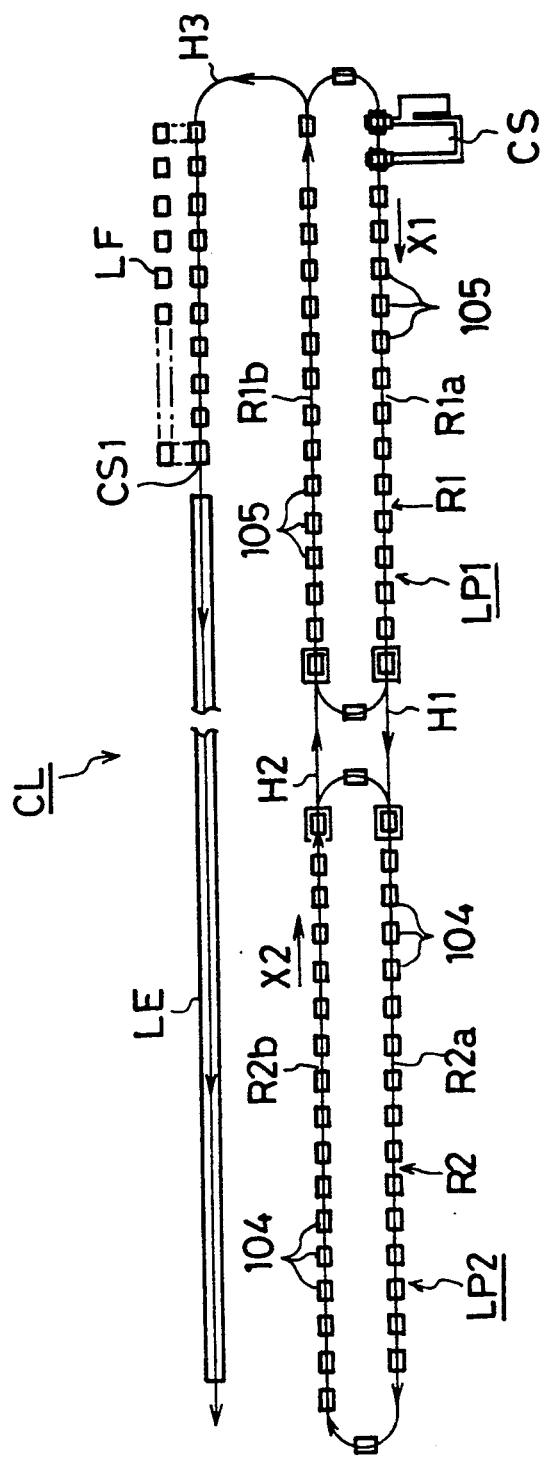

The upper vehicle body section 1 is then conveyed into the vehicle body assembly line CL with the aid of conveying means (not shown) after the lid members have been removed from the upper vehicle body section 1. The vehicle body assembly line CL is so arranged as to assemble various different models of automotive vehicles at the same time and it comprises a first parts mounting line LP1 and a second parts mounting line LP2, as shown in FIG. 16 and as will be described more in detail hereinafter. The step P3-3 for mounting the various parts to the upper vehicle body section 1 is basically carried out while the upper vehicle body section 1 is being conveyed through the first and second parts mounting line LP1 and LP2. The vehicle body assembly line CL further comprises an under vehicle body sections processing line LF and a lid members mounting line LE. The step P3-4 for mounting the under vehicle body section 101 is carried out in the under vehicle body sections processing line LF, and the step P3-8 for mounting the lid members is carried out in the lid members mounting line LE.

The first parts mounting line LP1 has a first work conveyance passage line R1 and a plurality of first mobile carriers or conveyors 105 are arranged to run on the first work conveyance passage line R1. Likewise, the second parts mounting line LP2 has a second work conveyance passage line R2 and a plurality of second mobile carriers or conveyors 104 are arranged to run on the second work conveyance passage line R2.

At a start end portion of a passage line section R1a of the first work conveyance passage line R1, a work entry section CS is disposed, and the upper vehicle body sections 1 as a work are conveyed into the work entry section CS intermittently. A terminal end portion of the passage line section R1a of the first work conveyance passage line R1 is connected through a hanger conveyor line H1 to a start end portion of a passage line section R2a of the second work conveyance passage line R2, while a terminal end portion of the passage line section R2a thereof is connected to a start end portion of a passage line section R2b of the second work conveyance passage line R2. A terminal end portion of the passage line section R2b of the second work conveyance passage line R2 is connected through a hanger conveyor line H2 to a start end portion of a passage line section R1b of the first work conveyance passage line R1, while a terminal end portion of the passage line section R1b thereof is connected through a hanger conveyor line H3 to the under vehicle body sections processing line LF. With the arrangement as described hereinabove, the first parts mounting line LP1 is of a loop structure and the second parts mounting line LP2 is of a loop structure. Further, the first and second parts mounting lines LP1 and LP2 in whole form another loop structure.

The upper vehicle body section 1 is conveyed to the work entry section CS and loaded on the first mobile carrier or conveyor 105. The upper vehicle body section 1 loaded on the first mobile carrier or conveyor 105 is conveyed from the start end portion to the terminal end portion of the passage line section R1a of the first work conveyance passage line R1 in the direction as indicated by the arrow X1 in FIG. 16. While the upper vehicle body section 1 is conveyed with the aid of the first mobile carrier or conveyor 105 on the passage line section R1a of the first work conveyance passage line R1, various small parts such as wire-harnesses, grommets, clips and so on are mounted to the upper vehicle body section 1.

At the terminal end portion of the passage line section R1a of the first work conveyance passage line R1, a work evacuation section Q1a is disposed to evacuate the upper vehicle body section 1 from the first mobile carrier or conveyor 105 and the upper vehicle body section 1 is then transferred to the hanger conveyor line H1 which conveys the upper vehicle body section 1 to the second parts mounting line LP2. In the second parts mounting line LP2, the upper vehicle body section 1 is transferred from the hanger conveyor line H2 to the second mobile carrier or conveyor 104.

The upper vehicle body section 1 is conveyed with the aid of the second mobile carrier or conveyor 104 from the start end portion of the passage line section R2a of the second work conveyance passage line R2 to the terminal end portion of the passage line section R2a thereof and further from the start end portion of the passage line section R2b of the second work conveyance passage line R2 to the terminal end portion of the passage line section R2b thereof in the direction, as indicated by the arrow X2 in FIG. 16. In and along the passage line sections R2a and R2b of the second work conveyance passage line R2, a plurality of working stations are disposed and working robots are disposed in the plural working stations, thereby mounting various parts, such as interior units, a dash board unit, rear seats, front and rear windshield glass panels, and so on, to the upper vehicle body section 1 with the aid of the working robots while the upper vehicle body section 1 is conveyed through and along the passage line sections R2a and R2b of the second work conveyance passage line R2.

At the terminal end portion of the passage line section R2b of the second work conveyance passage line R2, the upper vehicle body section 1 is transferred from the second mobile carrier or conveyor 104 to the hanger conveyor line H2 and conveyed to the passage line section R1b of the first work conveyance passage line R1 of the first parts mounting line LP1. As the upper vehicle body section 1 has been conveyed to the passage line section R1b of the first work conveyance passage line R1 thereof, the upper vehicle body section 1 is then transferred from the hanger conveyor line H2 to the first mobile carrier or conveyor 105 located at the start end portion of the passage line section R1b of the first work conveyance passage line R1.

Then, the upper vehicle body section 1 reloaded on the first mobile carrier or conveyor 105 is then conveyed with the aid of the first mobile carrier or conveyor 105 from the start end portion to the terminal end portion of the passage line section R1b of the first work conveyance passage line R1. While the upper vehicle body section 1 is being conveyed on and along the passage line section R1b thereof, the various parts mounted to the upper vehicle body section 1 are fastened with bolts and so on. The upper vehicle body section 1 is then transferred from the first mobile carrier or conveyor 105 to the hanger conveyor line H3 at the terminal end portion of the passage line section R1b of the first work conveyance passage line R1 and conveyed to the under vehicle body sections processing line LF after completion of the mounting operations.

Figure 17:
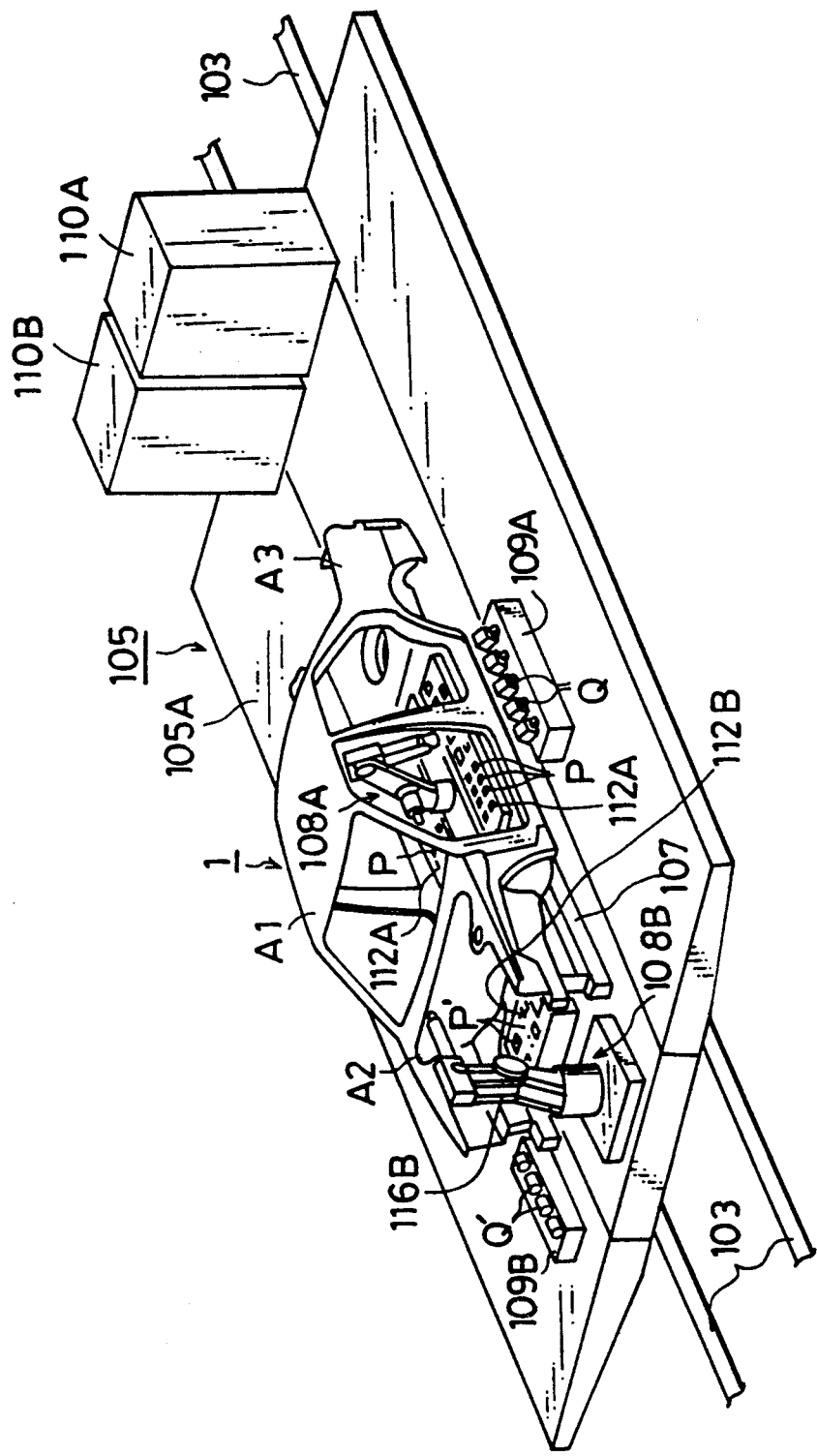
Figure 18:
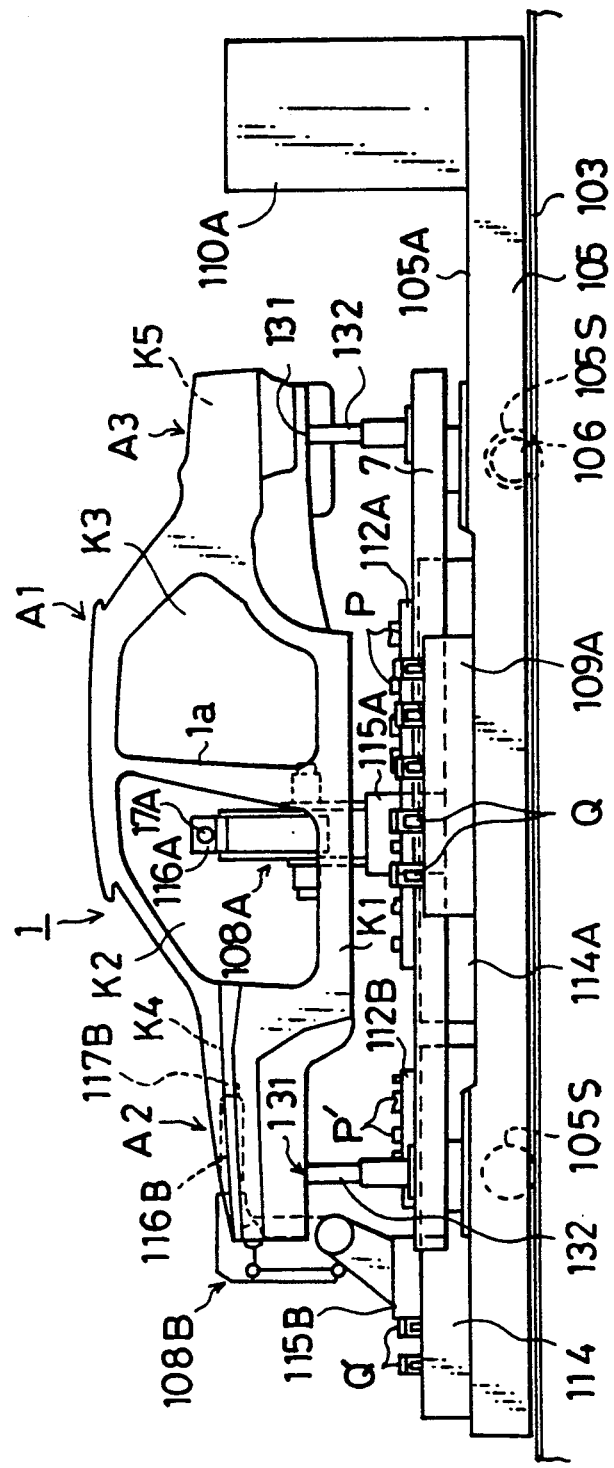

Description will now be made of the first mobile carrier or conveyor 105 with reference to FIGS. 17 et seq.

Figure 20:
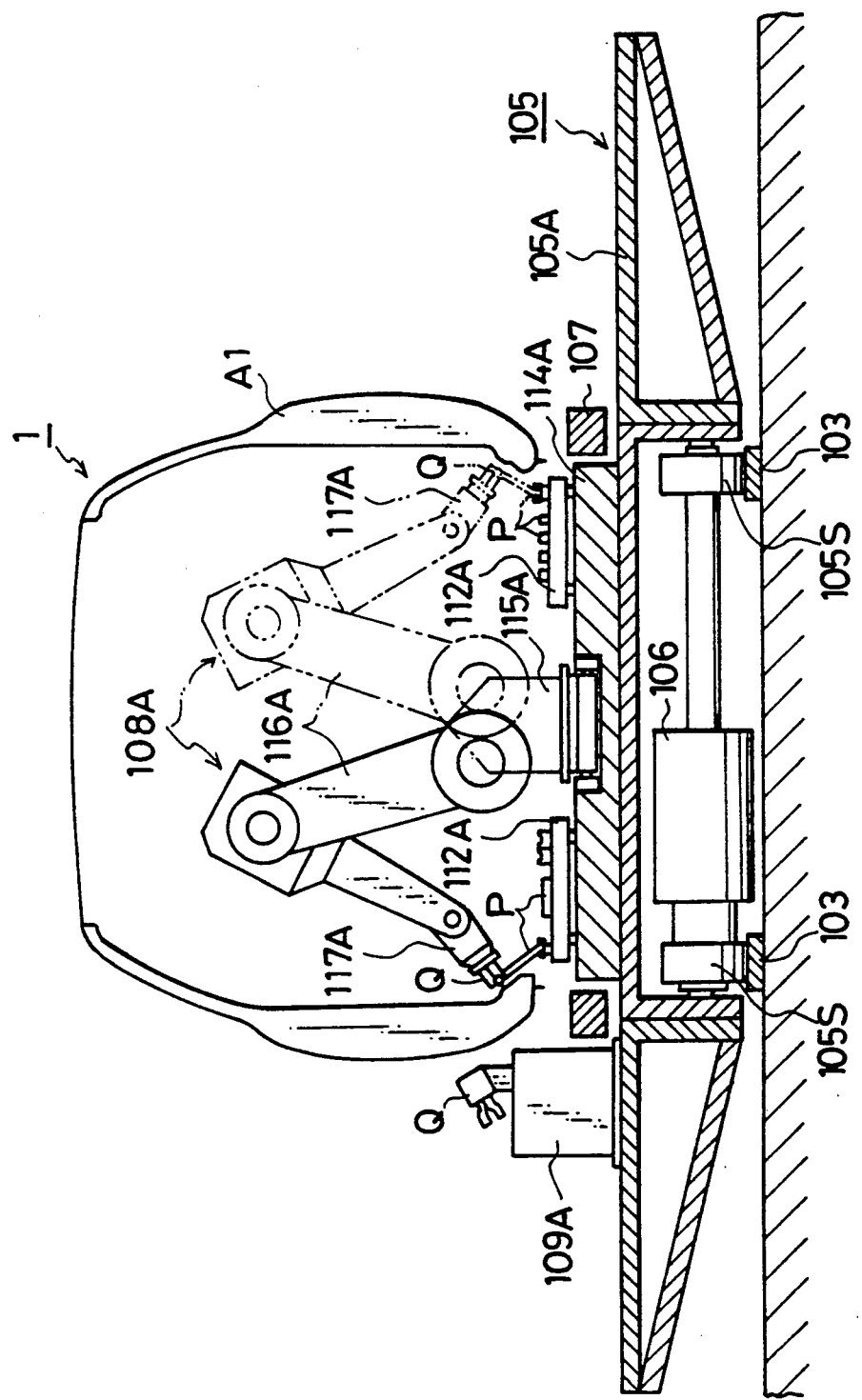
Figure 21:
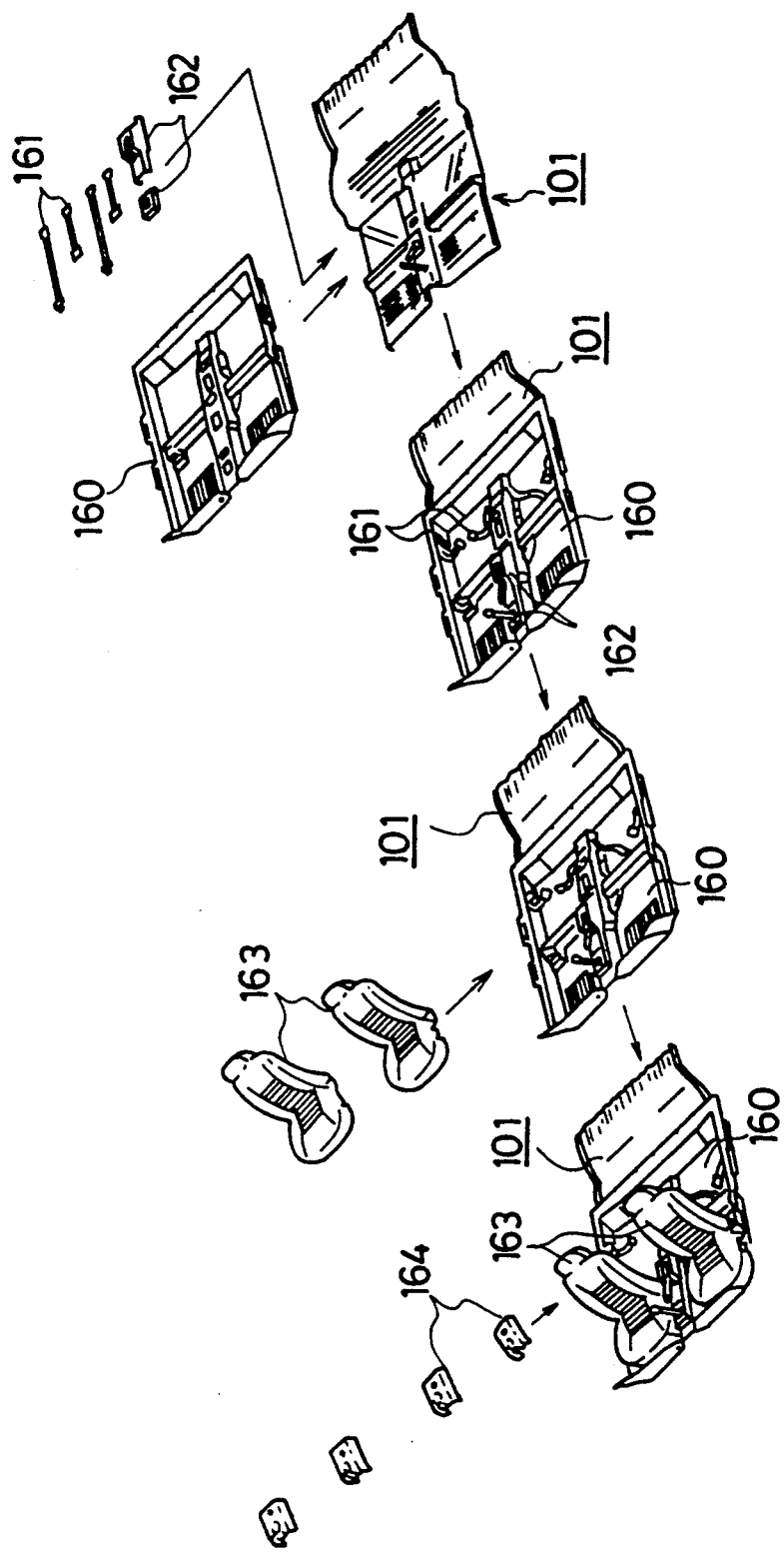

As shown in FIG. 20, the first mobile carrier or conveyor 105 disposed on the first parts mounting line LP1 has plural driving wheels 105S connected to an electric motor 106 and it runs on a rail 103 with the aid of driving force of the electric motor 106. The rail 103 constitutes the work conveyance passage line R1.

On a work supporting face 105A of the first mobile carrier or conveyor 105 are disposed a main pallet 107, a first working robot 108A, a second working robot 108B, first and second tools tables 109A and 109B as well as first and second control units 110A and 110B.

The main pallet 107 is of a frame shape and a plurality of upright columns 132 are disposed on the main pallet 107, as shown in FIG. 13. On a top of each of the columns 132 is disposed an engaging pin 131 standing erect. The engaging pins 131 are disposed so as to be inserted into plural holes (not shown) formed on a bottom portion of an engine room section A2 and a trunk room section A3 of the upper vehicle body section 1. This arrangement allows the upper vehicle body section 1 to be aligned with the first mobile carrier or conveyor 105 in such a state that the upper vehicle body section 1 is supported on the plural columns 132.

The first working robot 108A comprises a base table 114A disposed on the work supporting face 105A of the first mobile carrier or conveyor 105, a pivotable section 115A disposed on the base table 114A, and a movable arm 116A supported on the pivotable section 115A. The first working robot 108A is disposed at a central portion of the first mobile carrier or conveyor 105 so as to be inserted through the floor opening section K1 of the upper vehicle body section 1 and to be located within the cabin section Al thereof, when the upper vehicle body section 1 is loaded on the first mobile carrier or conveyor 105.

Figure 19:
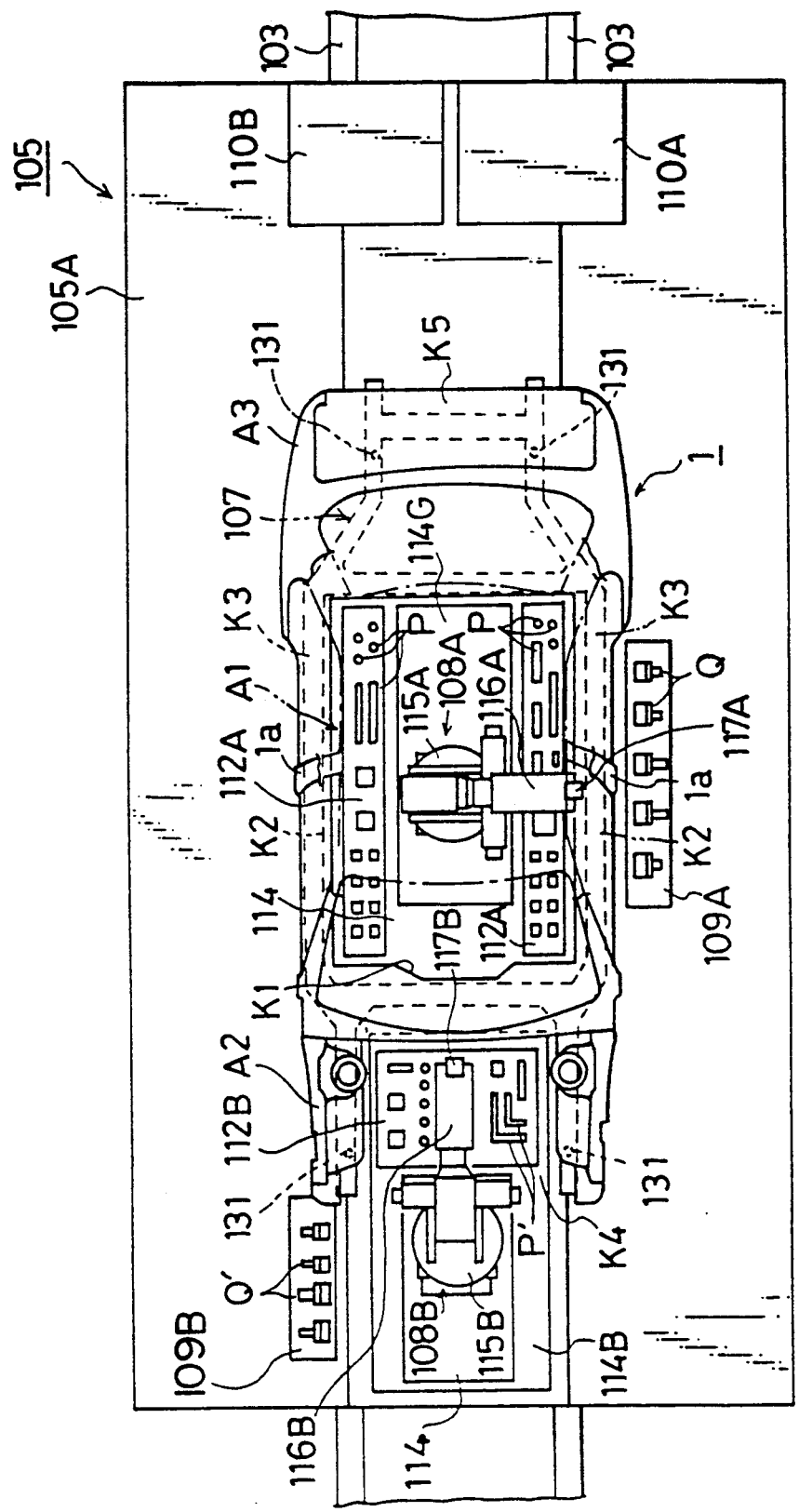

The pivotable section 115A of the first working robot 108A is disposed to allow a concave section 114G (FIG. 19) of the base table 114A to be movable in the longitudinal direction of the first mobile carrier or conveyor 105, i.e. in the lengthwise direction of the upper vehicle body section 1. To the base table 114A is disposed a sub-pallet 112A in its predetermined position, and various parts P, such as grommets, wire-harnesses, clips and fasteners, are placed in predetermined positions. The various parts P are mounted mainly to the inside of the cabin section Al of the upper vehicle body section 1.

The second working robot 108B comprises a base table 114B disposed on the work supporting face 105A of the first mobile carrier or conveyor 105, a pivotable section 115B disposed on the base table 114B, and a movable arm 116B supported on the pivotable section 115B. The second working robot 108B is disposed at a forward portion of the first mobile carrier or conveyor 105 so as to be inserted through the engine room opening section K4 of the upper vehicle body section 1 and to be located within the engine room section A2 thereof, when the upper vehicle body section 1 is loaded on the second mobile carrier or conveyor 105.

The pivotable section 115B of the second working robot 108B is disposed to allow a concave section 114 (FIG. 19) of the base table 114B to be movable in the longitudinal direction of the first mobile carrier or conveyor 105, i.e. in the lengthwise direction of the upper vehicle body section 1. To the base table 114B is disposed a sub-pallet 112B in its predetermined position, and various parts P', such as grommets, wire-harnesses, clips and fasteners, are placed in predetermined positions. The various parts P' are mounted mainly to the inside of the engine room section A2 of the upper vehicle body section 1.

The first and second working robots 108A and 108B are each of a multiple joint type and the movable arms 116A and 116B are pivotable with the aid of the pivotable sections 115A and 115B, respectively. The movable arms 116A and 116B are arranged so as to be stretched or bent at plural positions and they are provided at their tip portions with wrist sections 117A and 117B, respectively.

The first tool table 109A is disposed in the position close to the first working robot 108A. In other words, the first tool table 109A is disposed in the position which the wrist section 117A of the first working robot 108A can reach. Various tools Q are disposed on the first tool table 109A in predetermined positions and they can be mounted to or detached from the wrist section 117A of the first working robot 108A.

On the other hand, the first tool table 109B is disposed in the position close to the first working robot 108B. In other words, the first tool table 109B is disposed in the position which the wrist section 117B of the first working robot 108B can reach. Various tools Q' are disposed on the first tool table 109B in predetermined positions and they can be mounted to or detached from the wrist section 117B of the first working robot 108B.

The first and second control units 110A and 110B are disposed on an end portion of the first mobile carrier or conveyor 105. The first control unit 110A is arranged to control the first working robot 108A and generates a control signal for controlling the operations of the first working robot 108A in accordance with the preset control program. On the other hand, the second control unit 110B is arranged to control the second working robot 108B and generates a control signal for controlling the operations of the second working robot 108B in accordance with the preset control program.

A parts supply station, although not shown in the drawing, is disposed before the work entry section CS. In the parts supply station, the various parts P and P' are supplied to the respective sub-pallets 112A and 112B disposed on the first mobile carrier or conveyor 105, respectively.

As described hereinabove, the upper vehicle body section 1 is loaded on the first mobile carrier or conveyor 105 located in the work entry section CS and aligned with the first mobile carrier or conveyor 105 through the engaging pin 131.

When the upper vehicle body section 1 is loaded on the first mobile carrier or conveyor 105, the first working robot 108A disposed on the first mobile carrier or conveyor 105 is arranged so as to be located within the inside of the cabin section A1 of the upper vehicle body section 1, while the second working robot 108B disposed thereon is arranged so as to be located within the inside of the engine room section A2 thereof.

After the upper vehicle body section 1 has been aligned with the first mobile carrier or conveyor 105, the motor 106 of the first mobile carrier or conveyor 105 is operated, thereby starting the running of the first mobile carrier or conveyor 105 at a constant speed.

While the first mobile carrier or conveyor 105 is running, the first control unit 110A generates the control signal to the first working robot 108A and the second control unit 110B generates the control signal to the second working robot 108B. The first and second working robots 108A and 108B carry out the operations in a predetermined manner on the basis of the control signals generated from the first and second control units 110A and 110B, respectively.

The first working robot 108A is operated in such a manner that the mobile arm 116A extends outwardly through the front door opening section K2 or the rear door opening section K3 to such a length as allowing the wrist section 117A to reach the tool Q disposed on the first tool table 109A and selects the predetermined tool Q which in turn is mounted to the wrist section 117A. The various parts P disposed on the sub-pallet 112A are mounted one after another mainly to the inside of the cabin section A1 of the upper vehicle body section 1 with the aid of the tool Q which has been mounted to the wrist section 117A of the first working robot 108A. In such a state as indicated by the solid line and the phantom line in FIG. 20, the wrist section 117A of the first working robot 108A selects the particular part P from the various parts P disposed on the sub-pallet 112A with the aid of the tool Q mounted to the wrist section 117A thereof and the particular part P is then mounted to a peripheral portion of the cabin section A1 of the upper vehicle body section 1 around the sub-pallet 112A. In the mounting operations for mounting the parts P to the upper vehicle body section 1, the first working robot 108A is so arranged as to make necessary changes for tools Q to be mounted to the wrist section 117A thereof, in accordance with the parts P to be mounted to the upper vehicle body section 1.

After the upper vehicle body section 1 has been aligned with the first mobile carrier or conveyor 105, the parts P and P' are then mounted to the upper vehicle body section 1 with the aid of the first and second working robots 108A and 108B disposed on the first mobile carrier or conveyor 105, respectively, while the first mobile carrier or conveyor 105 is running.

As described hereinabove, the upper vehicle body section 1 is maintained during the mounting operations by the first and second working robots 108A and 108B in such a state that it is aligned with the first and second working robots 108A and 108B with high accuracy during the mounting operations by the first and second working robots 108A and 108B. Further, this arrangement can reduce the work load imposed on the first and second working robots 108A and 108B and shorten the time during which the first and second working robots 108A and 108B wait for the entry of the first mobile carrier or conveyor 105 with the upper vehicle body section 1 loaded thereon. In addition, the changes for the tools Q by the first and second working robots 108A and 108B can be made within an extremely short period of time and during the conveyance of the upper vehicle body section 1 by the first mobile carrier or conveyor 105 because the tools Q are disposed on the first mobile carrier or conveyor 105, so that this arrangement can remarkably improve the rate of operation of the first and second working robots 108A and 108B.

Furthermore, even if the first mobile carrier or conveyor 105 or at least one of the first and second working robots 108A and 108B would cause a failure, the first mobile carrier or conveyor 105 concerned can be evacuated from the work conveyance passage line R1 of the first parts mounting line LP1, thereby avoiding the adverse impact of the failure caused on the first mobile carrier or conveyor 105 or the working robot upon the operations in the first parts mounting line LP1 in whole. This can suppress a decrease in the production efficiency of the upper vehicle body sections 1. The changes for steps of mounting operations for the assembly of the upper vehicle body section 1 on the first mobile carrier or conveyor 105 can be made with ease and without causing any inconvenience for the first parts mounting line LP1, thereby improving the freedom of the changes for steps for the assembly of the upper vehicle body section 1.

The second working robot 108B can be operated in substantially the same manner as the first working robot 108A. The second working robot 108B can mount the various parts P' disposed on the sub-pallet 112B mainly to the inside of the engine room section A2 of the upper vehicle body section 1 by changing the tools Q' in accordance with the parts P' to be mounted to the upper vehicle body section 1.

Under vehicle body mounting step P3-3

Figure 23:
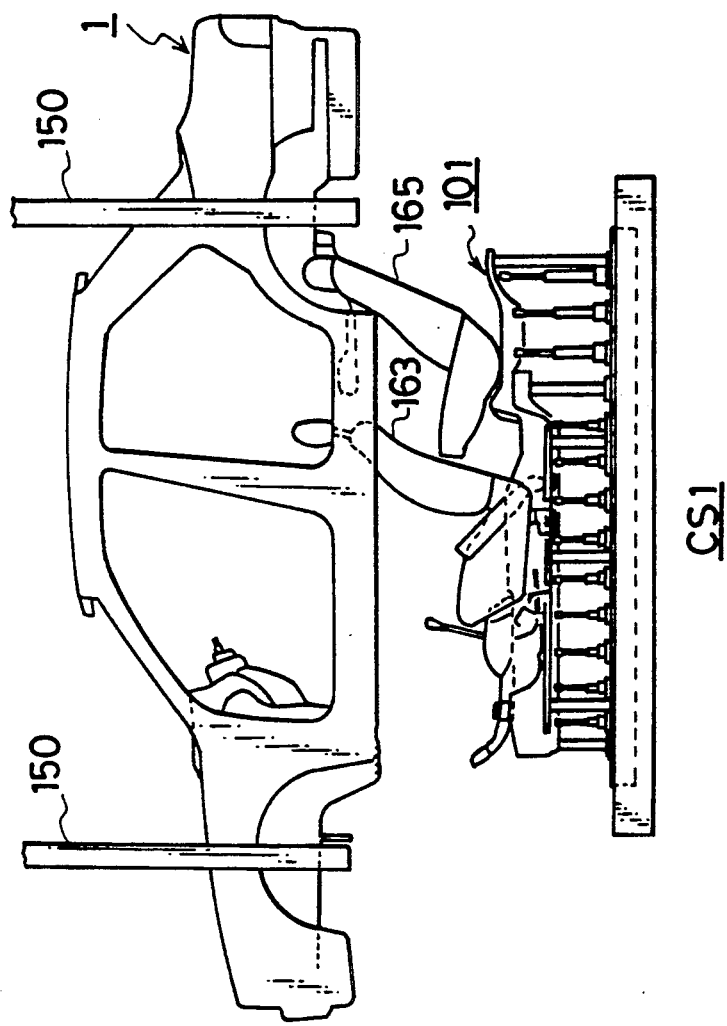

In the under vehicle body mounting step P3-3, the parts, units, mountings or accessories are mounted in an exclusive mounting line to the under vehicle body section 101 conveyed from the coating step P2. The under vehicle body sections 101 are aligned with the pallets (not shown) of the mobile carrier or conveyor and then conveyed one after another to the plural stations of the mounting line. In the first station, parts such as a floor mat 160, a rear seat belt 161, a rear console 162 and so on are mounted to the under vehicle body section 101. In the station which follows, small parts such as fasteners and bolts are mounted to the under vehicle body section 101 with the aid of a robot (not shown). Then, left-hand and right-hand front seats 163 are mounted to the under vehicle body section 101 with the aid of a robot (not shown) in the station which follows. In the following station, four seat protectors 164 are mounted to protect the foot portions of the front seat 163. In the station which follows, a rear seat 165 is temporarily mounted to the under vehicle body section 101, as shown in FIG. 23.

As the parts, units, mountings or accessories are mounted to the under vehicle body section 101 in the mounting line exclusive for mounting them, in such a state that the under vehicle body section 101 is separated from the upper vehicle body section 1, the working efficiency in the mounting operations for mounting them can be improved to a remarkably high extent by employing robots, and so on.

Figure 22:
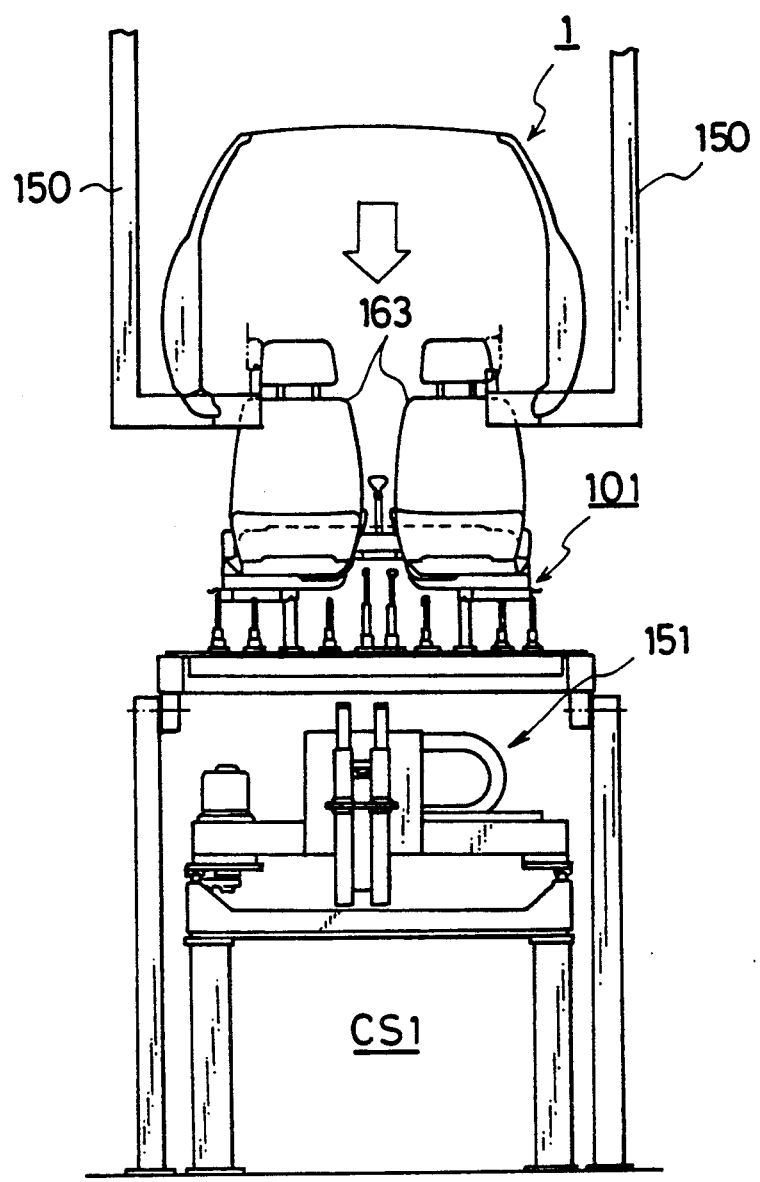

Assembly step P3-5 for assembly of the upper vehicle body section with the under vehicle body section As shown in FIG. 16, the upper vehicle body section 1 is assembled with the under vehicle body section 101 in the station CS1. The upper vehicle body section 1 is supported by an arm 150 (FIGS. 22 and 23) mounted to an elevating-lowering apparatus (not shown) and conveyed to the assembly station CS1. In the assembly line station CS1, the under vehicle body section 101 is loaded underneath the upper vehicle body section 1 and they are joined together with the aid of a coupling device or apparatus 151 after mounting the upper vehicle body section 1 to the under vehicle body section 101. The coupling device 151 is disposed below the under vehicle body section 101 in the assembly line CS1. The upper vehicle body section 1 is assembled with the under vehicle body section 101 by means of connection by bolts and nuts, adhesion, welding or a combination of these methods.

After the upper vehicle body section 1 has been assembled with the under vehicle body section 101, the nose unit P3-7 containing a shroud panel is mounted to the upper vehicle body section 1 in an station located on the upstream side of the lid members mounting line LE, as shown in FIG. 16.

Lower parts unit mounting step P3-6

Figure 24:
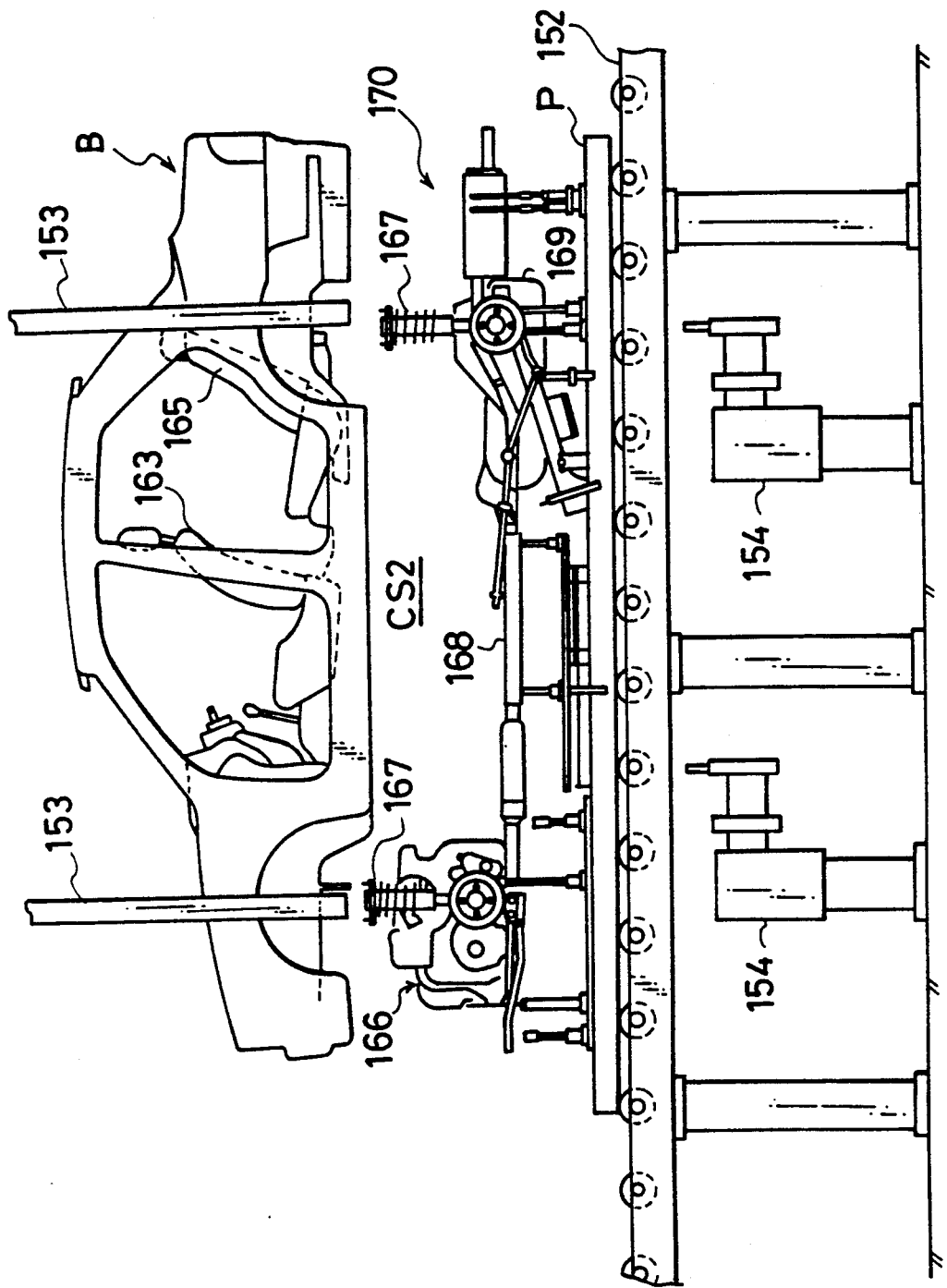

In the lower parts unit mounting step P3-6, the lower parts unit 170 previously aligned with and disposed on the pallet P (FIG. 24) in a sub-line is supplied to a second assembly station CS2 disposed in the later stage of the first assembly station CS1.

The lower parts unit 170 may comprise an internal combustion engine 166, a transmission (not shown), front and rear suspensions 167, exhaust system parts 168 and a fuel tank 169.

In the second assembly station CS2, the lower parts unit 170 is placed on a belt conveyor 152. On the other hand, a vehicle body section assembly B of the upper vehicle body section 1 assembled with the under vehicle body section 101 is conveyed to the second assembly station CS2 with the aid of the supporting arms 153 contained in the elevating-lowering unit or apparatus (not shown). Then, the vehicle body section assembly B is lowered toward the lower parts unit 170 and the former is mounted to the lower parts unit 170. In the assembly station CS2, two coupling robots 154 are disposed below the belt conveyor 152 and they are operated to fasten the vehicle body section assembly B with the lower parts unit 170 with bolts and so on. As the vehicle body section assembly B of the upper vehicle body section 1 and the under vehicle body section 101, which is high in rigidity, is coupled and fastened with the lower parts unit 170, the lower parts unit 170 that exerts a great impact upon the running performance can be mounted to the vehicle body section assembly B with accuracy.

It can be noted as a matter of course that the lower parts unit 170 can be mounted to the under vehicle body section 101 and thereafter the upper vehicle body section 1 is mounted to the assembly of the under vehicle body section 101 with the lower parts unit 170 in conventional manner.

Lid members mounting step P3-8

The lid members mounting step P3-8 is carried out in the lid members mounting line LE along which and on whose sides mounting units or apparatuses such as robots are disposed. The mounting units or apparatuses mount the lid members, such as the left-hand and right-hand side doors 15, the bonnet 210, left-hand and right-hand front fenders 214, and the trunk lid 211, to the vehicle body section assembly B with the aid of the robots. The lid members are provided with the necessary parts and then supplied to the lid members mounting line LE through the belt conveyor line 152.

As described hereinabove, the lid members are mounted to the vehicle body section assembly B of the upper vehicle body section 1 with the under vehicle body section 101, to which the lower parts unit 170 have been mounted in the assembly station CS2, so that the mounting of the lid members causes no interference with the mounting of the lower parts units. Further, an apparatus or unit for holding the bonnet 210, the trunk lid 211 and so on in an open state and related devices can be omitted so that this omission is advantageous in the terms of the economy of instrument and the efficiency in the operations for mounting the lower parts units 170 can be improved. In addition, this system is extremely efficient because the lid members can be mounted one after another to the vehicle body section assemblies B which are being conveyed one after another through the belt conveyor line 152 extending from and connected to the assembly station CS2 where the lower parts unit 170 is mounted to the upper vehicle body section 1 assembled with the under vehicle body section 101.

Other embodiments

Figure 25:
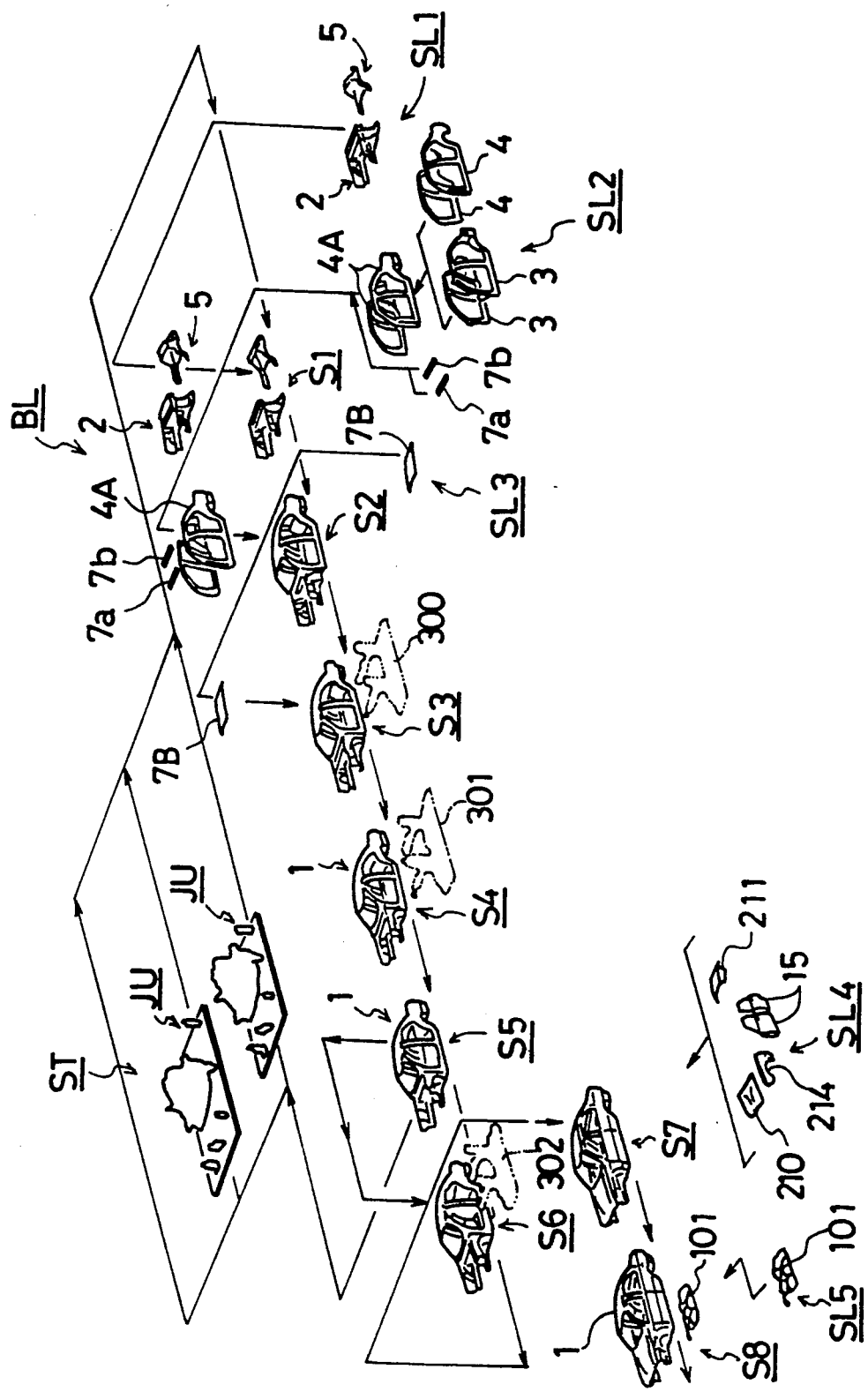

FIGS. 25 et seq are directed to the other embodiments according to the present invention. In those embodiments, the identical elements are provided with the same reference symbols or numerals and duplicate description of those elements will be omitted from the description which follows.

Figure 26:
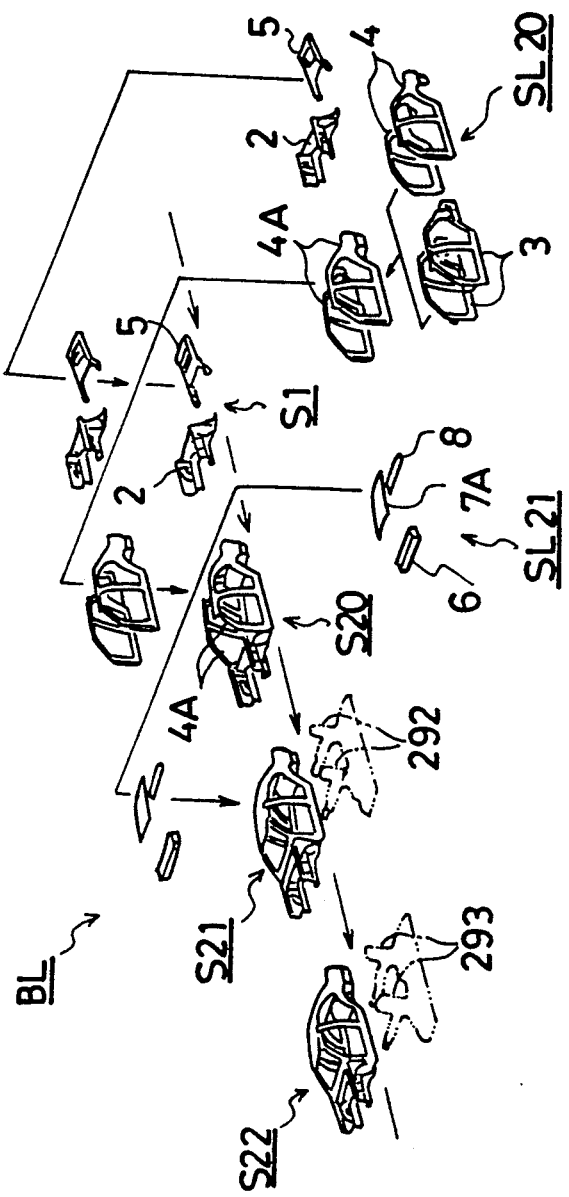

Second & Third Embodiments (FIGS. 25 & 26)

FIGS. 25 and 26 are directed to the second and third embodiments relating to the white vehicle body assembly line BL. The following is a summary of the white vehicle body assembly line BL for ready reference to the white vehicle body assembly line BL in the first embodiment, in order to summarize the difference from the first embodiment.

First sub-line SL1: assembly of the front body 2 with the floor assembly 5
First station S1: setting of the assembly of the front body 2 with the floor assembly 5 to the jig unit JU
Second sub-line SL2: assembly of the side inner panels 3
Second station S2: setting of the side inner panels 3 to the jig unit JU
Third sub-line SL3: assembly of the front header 7a and the rear header 7b
Third station S3: setting the assembly of the front header 7a with the rear header 7b to the jig unit JU and temporarily welding
Fourth station S4: additionally welding
Fourth sub-line SL4: assembly of the side outer panels 4
Fifth station S5: setting the assembly of the side outer panels 4 to the jig unit JU
Fifth sub-line SL5: assembly of the roof outer panel 7B, the rear package tray assembly 8 and the cowl-dash panel unit 6
Sixth station S6: setting of the assembly of the roof outer panel 7B, the rear package tray assembly 8 and the cowl-dash panel unit 6 to the jig unit JU and temporarily welding
Seventh station S7: additionally welding
Sixth sub-line SL6: assembly of the lid members, such as the bonnet 210, the trunk lid 211, the side doors 15 and so on
Eighth station S8: temporarily mounting of the assembly of the lid members, such as the bonnet 210, the trunk lid 211, the side doors 15 and so on
Ninth station S9: removal of the jig unit JU from the vehicle body section assembly Second Embodiment (FIG. 25)

First sub-line SL1

In the first sub-line SL1, the members structuring the front vehicle body section 2, such as the left-hand and right-hand front frames, the left-hand and right-hand wheel aprons, the dash lower panel, the dash lower member and the cowl-dash panel unit 6, are assembled. The cowl-dash panel unit 6 comprises the cowl panel and the dash upper panel, and they are assembled and then with the front vehicle body section 2. The rear floor assembly 5 comprises the rear floor panel, the left-hand and right-hand rear frames, the fourth cross-member, the rear package tray, the left-hand and right-hand inner wheel housings, and so on, and the members structuring the rear floor assembly 5 are assembled.

In the first sub-line SL1, the trunk floor, a rear end cross-member and a rear end panel are assembled as a rear end body section (not shown) which in turn is fed to the second station S2 for mounting.

Second sub-line SL2

In the second sub-line SL2, the left-hand and right-hand side inner panels 3 are composed each of the inner panel body, the inner roof rail, the impact bracket, the wheel housing, the suspension reinforcing member and so on, and these members are assembled. Likewise, the left-hand and right-hand side outer panels 4 are composed each of the outer panel body, the front hinge reinforcing member, the rear hinge reinforcing member, the center pillar reinforcing member, the rear striker reinforcing member, the corner plates and so on, and these members are assembled. Further, the left-hand and right-hand body side panels 4A comprise each the side inner panel 3 and the side outer panel 4, and these members are assembled with each other.

It is further to be noted that the side inner panels 3 and the side outer panels 4 are separately and individually supplied to the jig unit JU, without assembling the side inner panels 3 with the side outer panels 4, and they can be mounted with the aid of the jig unit JU.

The roof inner panel 7A is composed of the front header 7a and the rear header 7b and these members can be assembled with header inner and outer panels in the second sub-line SL2.

Third sub-line SL3

In the third sub-line SL3, the roof inner panel 7B is composed of the outer panel body, the roof bows 7c, and so on.

Fourth sub-line SL4

In the fourth sub-line SL4, the lid members, such as the bonnet 210, the trunk lid 211, the left-hand and right-hand side doors 15 and the front header 214, are assembled. It is to be noted herein that the lid members are composed mainly of metal members, however, they may be composed of a composite member made of metal members and FRP members or composed mainly of FRP members.

Fifth sub-line SL5

In the fifth sub-line SL5, the under vehicle body section 101 comprises the front floor panel, a second cross-member, a shaft tunnel, a third cross-member, a center floor panel and so on, and they are assembled. It is noted herein that the front floor panel and the center floor panel constitute a main floor and further that the under vehicle body section 101 is composed mainly of metal members, although it may be made mainly of FRP members.

First station S1

In the first station S1, the front vehicle body section 2 and the rear floor assembly 5 are set to the jig unit JU.

Second station S2

In the second station S2, the vehicle body side panel 4A, the front header 7a and the rear header 7b are set to the jig unit JU. In setting the vehicle body side panel 4A to the jig unit JU, the side inner panel 3 is aligned with the jig unit JU. Likewise, the header inner panel is aligned with the jig unit JU in setting the front and rear headers 7a and 7b to the jig unit JU.

Third station S3

In the third station S3, the roof outer panel 7B is set to the jig unit JU. Further, the roof outer panel 7B is temporarily welded to the upper vehicle body section 1 with the aid of a welding robot 300.

Fourth station S4

Additional welding is implemented with the aid of a welding robot 301.

Fifth station S5

In the fifth station S5, the jig unit JU is evacuated or removed from the upper vehicle body section 1 and the upper vehicle body section 1 is conveyed to the sixth station S6 with the aid of a hanger.

Sixth station S6

In the sixth station S6, a pallet is disposed and the upper vehicle body section 1 is placed on the pallet and subjected to further welding with the aid of two welding robots 302 located outside the upper vehicle body section 1 and one welding robot (not shown) located inside the upper vehicle body section 1.

The welding within the upper vehicle body section 1 can be implemented in the sixth station S6 with the aid of the welding robot, so that the efficiency in the welding operations can be improved to a remarkably great extent and the number of stations required for welding can be reduced.

Seventh station S7 & Eight station S8

The seventh station S7 and the eighth station S8 extend in a substantially straight line from the upstream stations S1 to S6, inclusive. The upper vehicle body sections 1 are conveyed from the sixth station S6 to the seventh station S7 through an elevating-lowering unit (not shown). The lid members are fed to the sixth station S7 from the fourth sub-line SL4. As described hereinabove, the lid members include the left-hand and right-hand side doors 15, the bonnet 210, the left-hand and right-hand front fenders 214, and the trunk lid 211. These lid members are temporarily mounted to the upper vehicle body section 1 through mounting pins or the like.

In the eighth station S8, the upper vehicle body section 1 is loaded in the middle position of the hanger 100 (FIGS. 14 and 15) and the under vehicle body section 101 is loaded in the lower position of the hanger 100. The under vehicle body section 101 is fed to the eighth station S8 from the fifth sub-line SL5. The hanger 100 with the upper vehicle body section 1 and the under vehicle body section 101 loaded thereon is then conveyed to the coating step P2.

Third Embodiment (FIG. 26)

This embodiment is a variant of the first embodiment (FIG. 2).

As shown in FIG. 26, there is additionally disposed a sub-line SL20 for assembling the side inner panel 3 with the side outer panel 4 to form a vehicle body side panel 4A which in turn is fed from the sub-line SL20 to a station S20. The left-hand and right-hand vehicle body side panels 4A are aligned with the jig unit JU and then fixed thereon.

The jig unit JU is then conveyed through a sub-line SL21 where an assembly of the front fender 7a with the rear fender 7b and the roof outer panel 7B is mounted to the roof panel 7A. Further, each of the cowl-dash panel unit 6 and the rear package tray assembly 8 is assembled. These vehicle body structuring assemblies 7A, 6 and 8 are then supplied to a station S21 where they are set to the jig unit JU.

In the station S21, the assemblies 7A, 6 and 8 mounted to the jig unit JU are temporarily welded with the aid of two welding robots 292 and then further welded with the aid of two welding robots 293 located in a station S22. After the welding has been finished, then the jig unit JU is conveyed to the eighth station S8 of the first embodiment.

Figure 27:
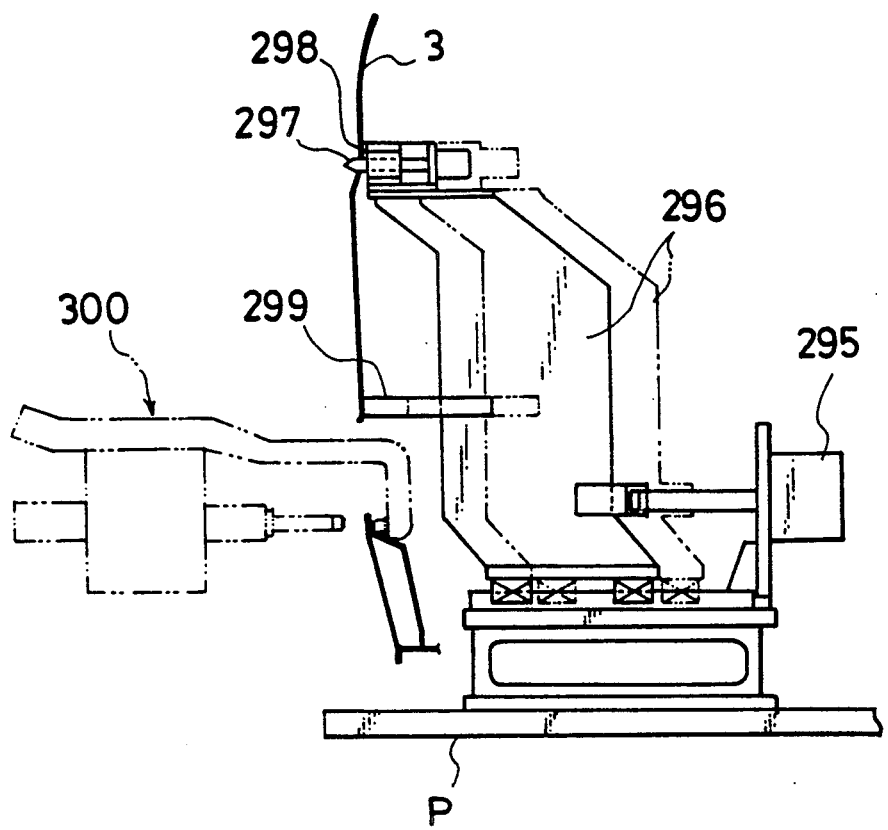

Fourth Embodiment (FIG. 27)

In the fourth embodiment according to the present invention, the jig unit JU is so arranged as to align the forward end portion of each of the left-hand and right-hand side inner panels 3. As shown in FIG. 27, the jig unit JU is provided with a supporting member 296 disposed to be movable by a cylinder 295 in left and right directions, when viewed in the drawing, with an aligning pin 297 disposed on an upper end portion of the supporting member 296, and with an aligning section 298. In addition, another aligning section 299 may be disposed in a middle position below the supporting member 296 in order to align a lower portion of the side inner panel 3. The side inner panel 3 is clamped by a clamping unit (not shown) mounted to the supporting member 296. In FIG. 27, reference numeral 300 denotes a welding gun for temporarily welding the side inner panel 3 in the third station S3.

It is to be understood that the present invention is not construed as being restricted in any respects to those described hereinabove, which are described merely for illustrative purposes, and as encompassing all changes, variations, and modifications within the spirit and scope of the present invention.

What is claimed is:

1. A method for the assembly of automotive vehicles in a vehicle body assembly line, comprising:

a white vehicle body assembly step for assembling an upper vehicle body section and for assembling an under vehicle body section, said white vehicle body assembly step including an under body section assembling step for assembling the under vehicle body section comprising a floor panel member and an upper vehicle body section assembling step for assembling the upper vehicle body section;

a coating step for coating the upper vehicle body section and the under vehicle body section subsequent to said white vehicle body assembly step while maintaining them separated from each other; and a part mounting step for separating mounting at least one part to each of the upper vehicle body section and the under vehicle body section after said coating step; and a part mounting step for separately mounting at least one part to each of the upper vehicle body section and the under vehicle body section after said coating step; and an upper and lower vehicle body assembly step subsequent to said part mounting step for assembling the upper vehicle body section with the under vehicle body section.

2. A method as claimed in claim 1, wherein said white vehicle body assembly step includes:

carrying out the upper vehicle body section assembly step of the white vehicle body assembly step in an upper vehicle body section assembly line with a jig unit disposed therein and providing a plurality of aligning means and a plurality of clamping means; and said method further comprising the steps of:

aligning a member for structuring the upper vehicle body section with the jig unit based on a position of an inner member of the member for structuring the upper vehicle body section and assembling the member with another member for forming the upper vehicle body section into the upper vehicle body section.

3. A method as claimed in claim 2, said method further comprising the step of:

aligning a body side panel with the jig unit based on a position of a side inner panel.

4. A method as claimed in claim 2, further comprising the step of aligning a roof outer panel with the jig unit based on a position of a roof bow mounted to the roof outer panel.

5. A method as claimed in claim 1, wherein said white vehicle body assembly step includes:

carrying out the upper vehicle body section assembly step of the white vehicle body assembly step in an upper vehicle body section assembly line with a jig unit disposed therein and providing a plurality of aligning means and a plurality of clamping means; and said method further comprising the steps of:

assembling a cowl panel with a dash panel to thereby form a cowl-dash panel unit prior to supplying said cowl panel to the jig unit and aligning the cowl-dash panel unit with the jig unit.

6. A method as claimed in claim 1, wherein said white vehicle body assembly step includes:

carrying out the upper vehicle body section assembly step of the white vehicle body assembly step in an upper vehicle body section assembly line with a jig unit disposed therein an providing a plurality of aligning means and a plurality of clamping means; and said method further comprising the steps of:

assembling rear package tray members to form a rear package tray assembly prior to supplying said rear package tray members to the jig unit and aligning the rear package tray assembly with the jig unit.

7. A method as claimed in claim 1, further comprising the steps of:

providing a conveying means for conveying the upper vehicle body and the lower vehicle body to said coating step, the conveying means comprises a hanger;

loading the upper vehicle body section on an upper position of the hanger; and loading the under vehicle body section on a lower position of the hanger.

8. A method as claimed in claim 1, wherein:

said coating step includes coating an anti-chipping paint after coating an overcoating paint; and said method further comprising the step of:

conveying the upper vehicle body section and the under vehicle body section with substantially identical conveying means throughout the coating step including said step of coating anti-chipping paint.

9. A method as claimed in claim 1, wherein:

said coating step comprises coating an under coating paint, coating an anti-chipping paint and coating an overcoating paint; said method further comprising the steps of:

conveying the upper vehicle body section and the under vehicle body section with substantially identical conveying means throughout the coating step up to said step of coating anti-chipping paint; and separating the upper vehicle body section and the under vehicle body section and processing the upper vehicle body section and the under vehicle body section separately after the step for coating the anti-chipping paint.

10. A method as claimed in claim 1, wherein said coating step includes a step of coating the under coating paint to the upper vehicle body section and the under vehicle body section;

said section further comprising the steps of:

conveying the upper vehicle body section and the under vehicle body section with substantially identical conveying means before the step of coating the under coating paint; and separating the upper vehicle body section and the under vehicle body section and processing the upper vehicle body section and the under vehicle body section separately after the step for coating the under coating paint.

11. A method as claimed in claim 1, further comprising the step of:

mounting a lid member including at least one of a bonnet, a door and a trunk lid to the upper vehicle body section prior to conveyance to said coating step.

12. A method as claimed in claim 11, further comprising the steps of:

removing the lid member from the upper vehicle body section after the upper vehicle body section has been coated in said coating step; and conveying the lid member removed from the upper vehicle body section to a vehicle body section assembly line, separately from the under vehicle body section, and mounting the lid member to the upper vehicle body section in said upper and lower vehicle body assembly step.

13. A method as claimed in claim 12, wherein:

said step of removing the lid member from the upper vehicle body section is done in an initial stage of said upper and lower vehicle body assembly step.

14. A method as claimed in claim 12, wherein:

said step of mounting the lid member in said upper and lower vehicle body assembly step includes mounting the lid member after the upper vehicle body section has been assembled with the under vehicle body section.

15. A method as claimed in claim 12, wherein said part mounting step includes:

using a mounting line for mounting a part;

providing a guide rail disposed in or along the mounting line;

loading a carrier disposed on and along the guide rail with the upper vehicle body section;

loading the carrier with a working robot for aligning the upper vehicle body section with the carrier;

mounting the part to the upper vehicle body section loaded thereon;

providing aligning means for aligning the upper vehicle body section with the carrier; and assembling the part disposed on the carrier to the upper vehicle body section while the upper vehicle body section is conveyed.

16. A method as claimed in claim 15, further comprising the step of:

disposing the working robot within a cabin section of the upper vehicle body section when the upper vehicle body section is loaded on the carrier.

17. A method as claimed in claim 16, wherein:

said step of mounting the part includes mounting a small part including at least one of a grommet, a wire-harness, a fastener and a clip to the inside of the cabin section of the upper vehicle body section.

18. A method as claimed in claim 15, further comprising the step of:

disposing the working robot in front of an engine room of the upper vehicle body section when the upper vehicle body section is loaded.

19. A method as claimed in claim 18, wherein:

said step of mounting the part includes mounting a small part including at least one of a grommet, a wire-harness, a fastener and a clip to the inside of the cabin section of the upper vehicle body section.

20. A method as claimed in claim 15, further comprising the step of:

mounting a lower part unit to the under vehicle body section after the under vehicle body section has been assembled with the upper vehicle body section.

21. A method as claimed in claim 20, wherein:

said step of mounting the lower part unit includes mounting a driving system part containing at least one of an internal combustion engine, an exhaust system part, and a suspension unit.

22. A method as claimed in claim 20, further comprising the step of:

mounting the lid member to the assembly of the upper vehicle body section with the under vehicle body section after said step of mounting the lower part unit.

23. A method as claimed in claim 15, further comprising the step of:

mounting a lower part unit to the under vehicle body section prior to the assembly of the under vehicle body section with the upper vehicle body section.

24. A method for the assembly of automotive vehicles in a vehicle body assembly line, comprising:

a white vehicle body assembly step for assembling an upper vehicle body section and for assembling an under vehicle body section, said white vehicle body assembly step including an under body section assembling step for assembling the under vehicle body section comprising a floor panel member and an upper vehicle body section assembling step for assembling the upper vehicle body section;

a coating step for simultaneously coating the upper vehicle body section and the under vehicle body section subsequent to said white vehicle body assembly step while maintaining them separated from each other; and a part mounting step for separately mounting at least one part to each of the upper vehicle body section and the under vehicle body section after said coating step; and an upper and lower vehicle body assembly step subsequent to said part mounting step for assembling the upper vehicle body section with the under vehicle body section.

* * * * *